(12) United States Patent
Gaskin et al.

(10) Patent No.: US 11,054,348 B2
(45) Date of Patent: Jul. 6, 2021

(54) DIE ARRANGEMENT

(71) Applicant: Specac Limited, Orpington (GB)

(72) Inventors: Ian Gaskin, Tunbridge Wells (GB);
Matthew Cooper, Bearsted (GB);
Anthony Atkins, Sidcup (GB);
Richard Lock, Orpington (GB)

(73) Assignee: Specac Limited, Kent (GB)

( * ) Notice: Subject to any disclaimer, the term of this patent is extended or adjusted under 35 U.S.C. 154(b) by 0 days.

(21) Appl. No.: 16/817,373

(22) Filed: Mar. 12, 2020

(65) Prior Publication Data

US 2020/0232890 A1 Jul. 23, 2020

Related U.S. Application Data

(63) Continuation of application No. PCT/EP2018/074804, filed on Sep. 13, 2018.

(30) Foreign Application Priority Data

Sep. 22, 2017 (GB) .................................... 1715367

(51) Int. Cl.
*B30B 15/32* (2006.01)
*G01N 1/28* (2006.01)
(Continued)

(52) U.S. Cl.
CPC ............... *G01N 1/286* (2013.01); *B22F 3/03* (2013.01); *B30B 11/02* (2013.01); *B30B 15/026* (2013.01);
(Continued)

(58) Field of Classification Search
CPC ....... B30B 11/02; B30B 11/04; B30B 15/026; B30B 15/028; B30B 15/32; B29C 43/36;
(Continued)

(56) References Cited

U.S. PATENT DOCUMENTS 3,382,540 A * 5/1968 Van de Maden et al. ..................
B22F 3/03
425/78
3,733,154 A 5/1973 Smith et al.
(Continued)

FOREIGN PATENT DOCUMENTS

CN 201637618 11/2010
CN 105547776 5/2016
(Continued)

*Primary Examiner* — James P Mackey
(74) *Attorney, Agent, or Firm* — Reinhart Boerner Van Deuren P.C.

(57) ABSTRACT

A die arrangement for pressing, sintering or stamping comprising: a die body with a cavity extending from an opening at a first end of said die body to an opening at a second end of said die body, and one or more moving parts arranged around the opening at said first end of said die body, wherein each moving part is displaceable between a first position and a second position. The die body may be configurable to receive a die plunger at said second end of said die body, said plunger being displaceable within the cavity. The die arrangement may further comprise an outer sleeve mounted on the die body, the outer sleeve being coaxial with the die body and having a first outer sleeve portion nearest to the first end of said die body, and one of: a second outer sleeve portion nearest to the second end of said die body; a second outer sleeve portion fixedly attached to the plunger base nearest to the second end of said die body; or, a second outer sleeve portion extending directly from the plunger base nearest to the second end of said die body, the second outer sleeve portion and the plunger base being a single unitary component.

20 Claims, 20 Drawing Sheets

(51) Int. Cl.
  *B30B 11/02* (2006.01)
  *B30B 15/02* (2006.01)
  *B22F 3/03* (2006.01)
  *B29C 43/50* (2006.01)

(52) U.S. Cl.
  CPC ............ *B30B 15/028* (2013.01); *B30B 15/32* (2013.01); *B29C 43/50* (2013.01); *B29C 2043/5061* (2013.01); *G01N 2001/2873* (2013.01)

(58) Field of Classification Search
  CPC .. B29C 43/50; B29C 2043/5061; G01N 1/286
  See application file for complete search history.

(56) References Cited

U.S. PATENT DOCUMENTS

| | | |
|---|---|---|
| 3,868,201 A | 2/1975 | Jacobson et al. |
| 4,379,684 A * | 4/1983 | Katagiri ................. B30B 11/02 425/415 |
| 4,781,567 A | 11/1988 | Miller et al. |
| 5,198,241 A | 3/1993 | Marcovecchio et al. |
| 5,635,223 A * | 6/1997 | Korsch ................... B30B 11/08 425/193 |
| 2008/0213358 A1 | 9/2008 | Arkenau-Maric et al. |

FOREIGN PATENT DOCUMENTS

| | | |
|---|---|---|
| GB | 2489658 | 10/2012 |
| GB | 2544569 | 5/2017 |
| WO | WO 03/074263 | 9/2003 |
| WO | WO 2012/104603 | 8/2012 |

\* cited by examiner

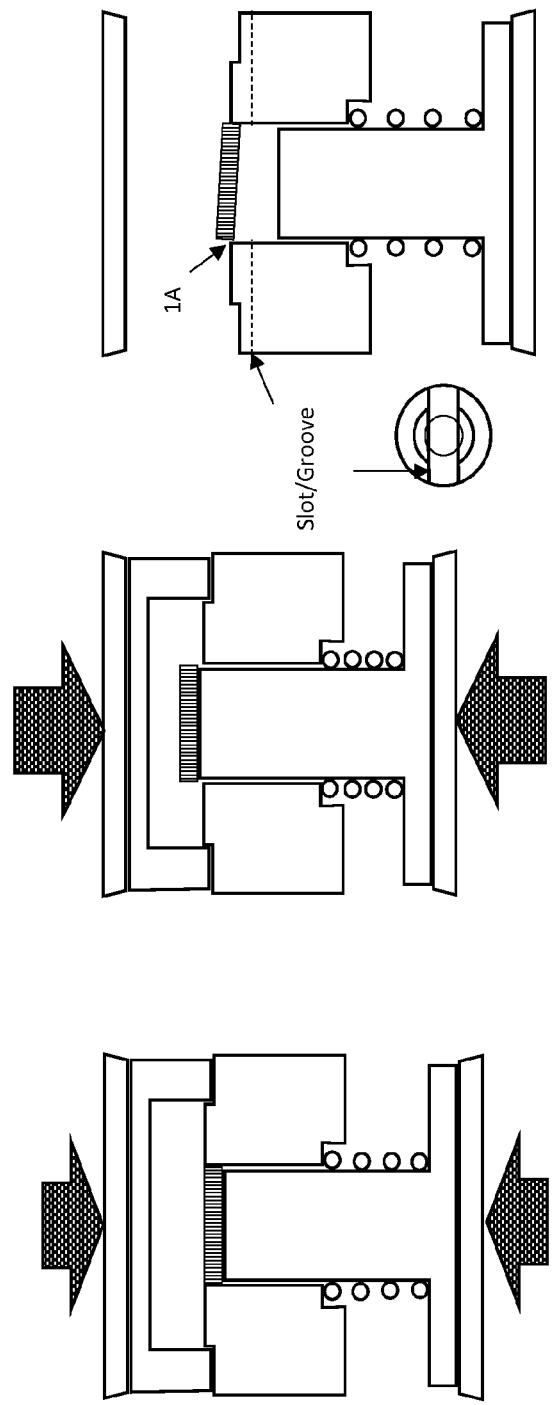

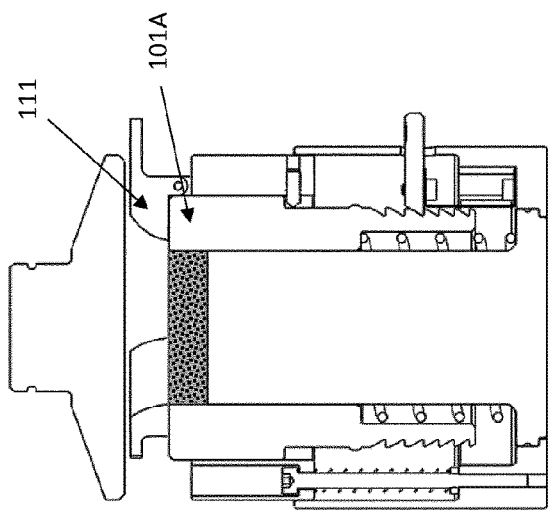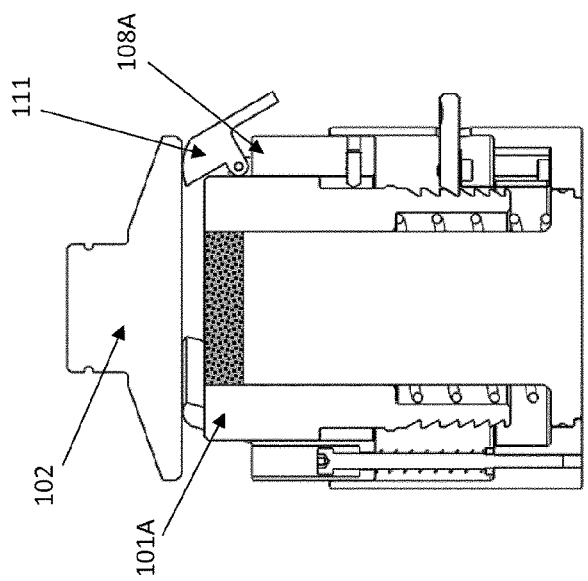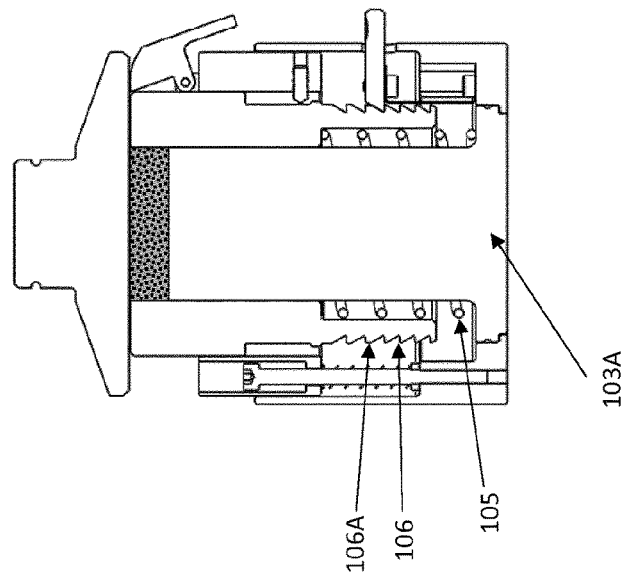

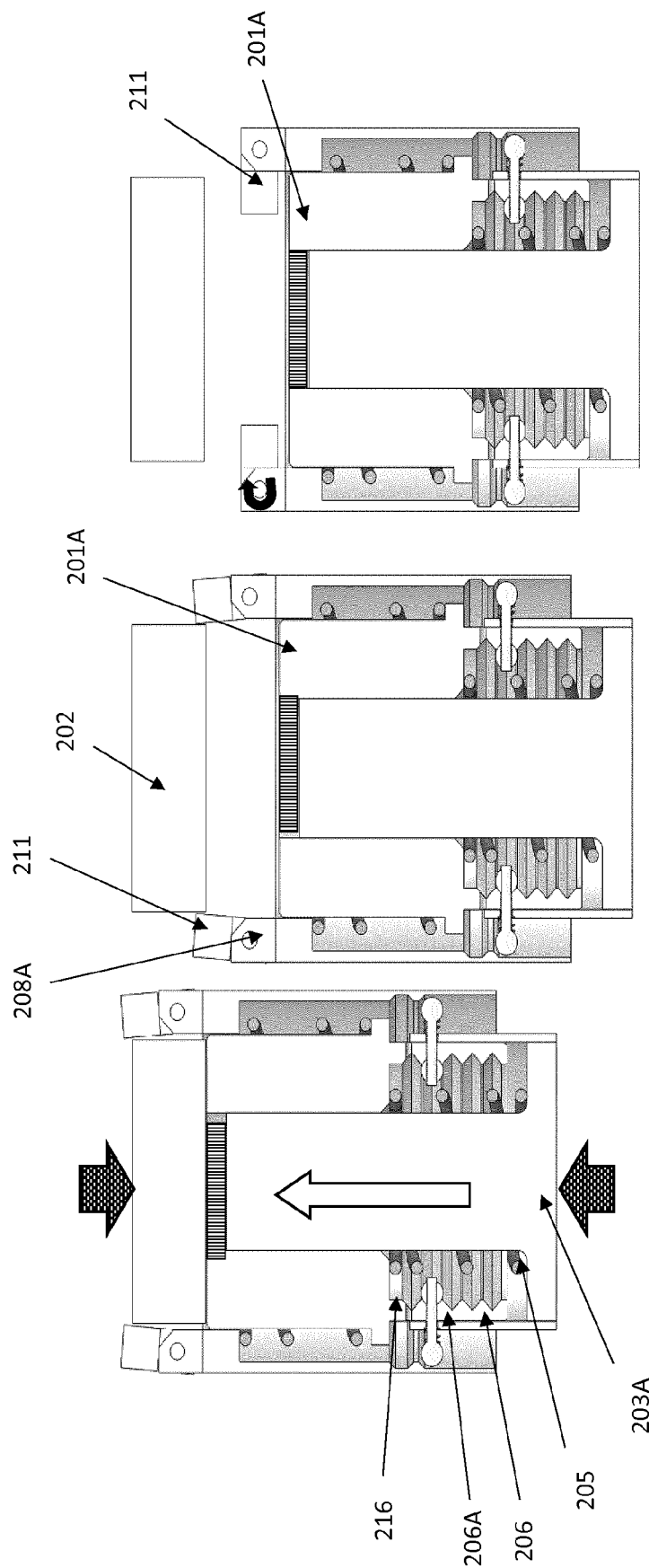

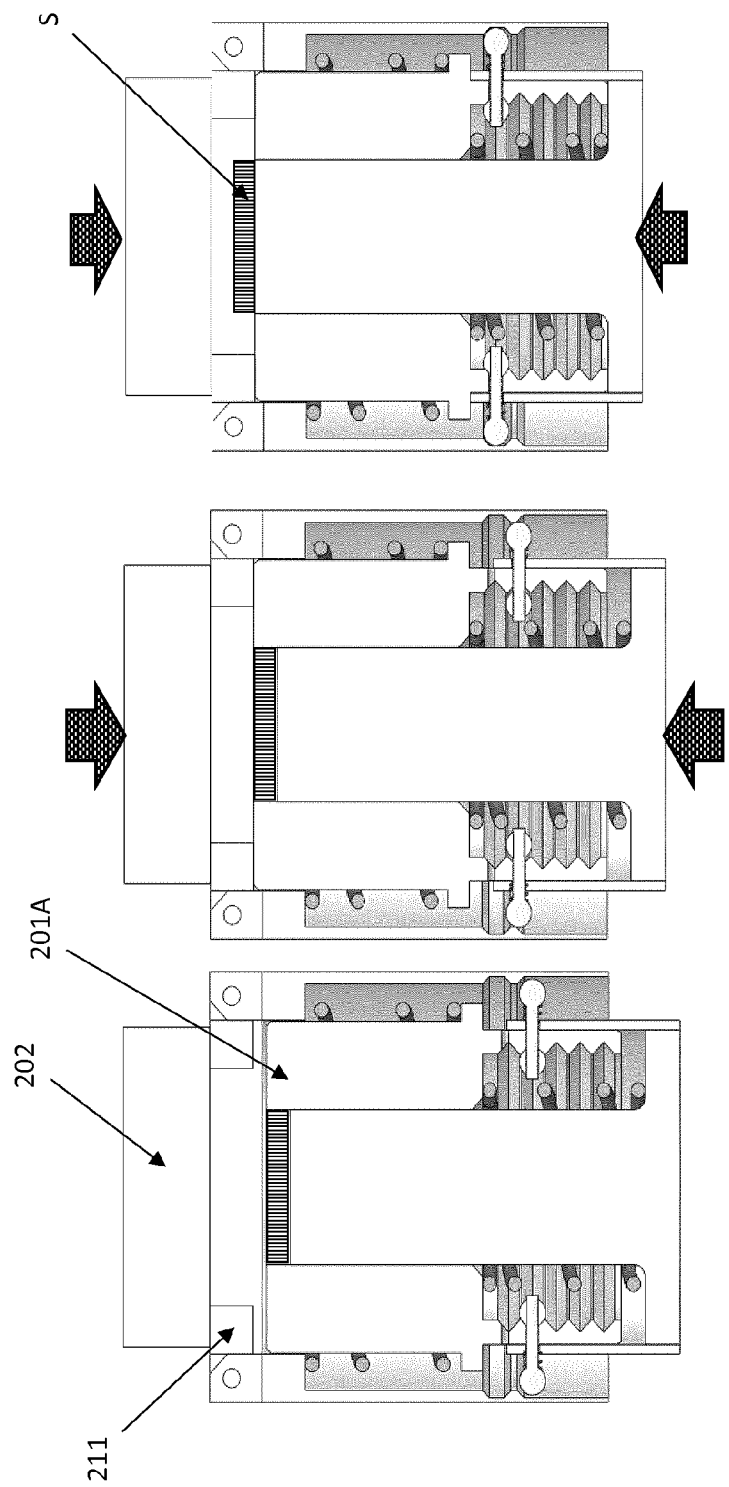

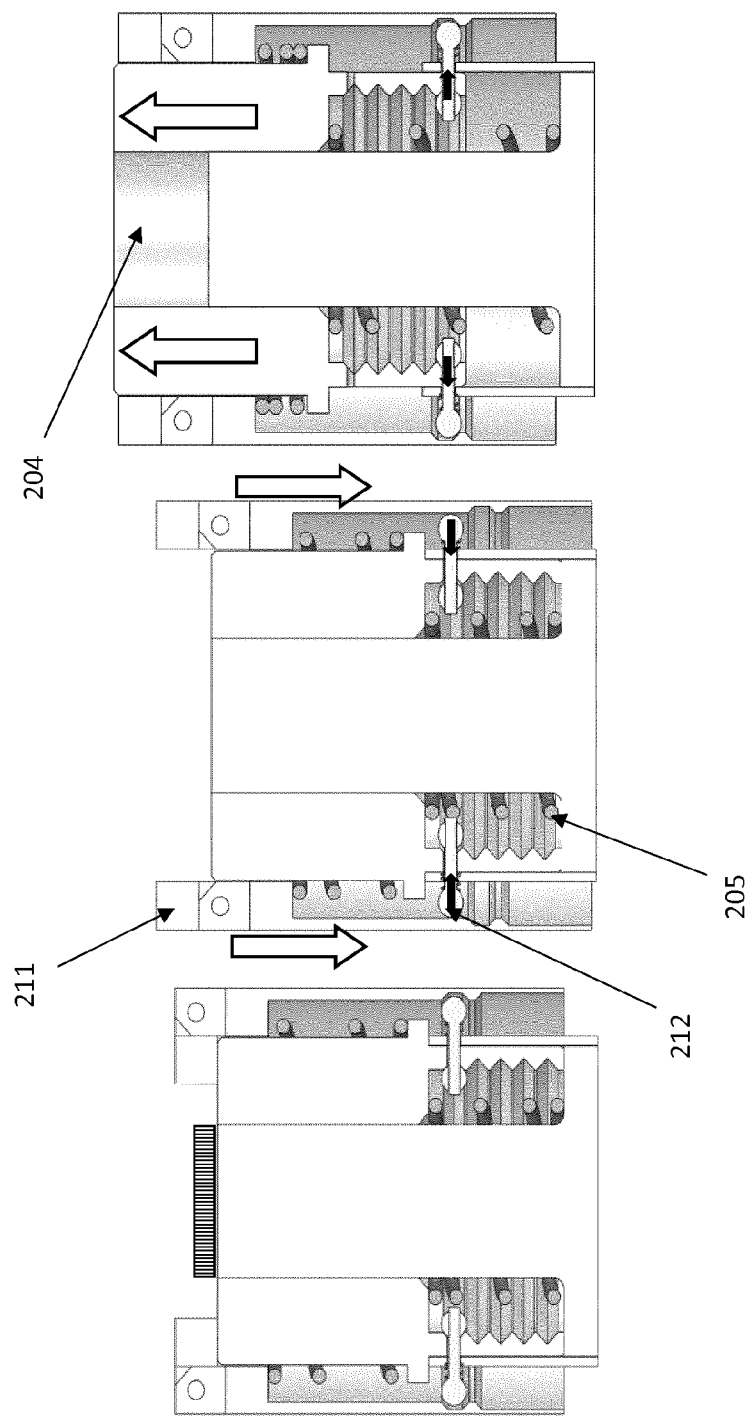

DIE ARRANGEMENT

CROSS-REFERENCE TO RELATED PATENT APPLICATIONS

This patent application is a continuation of PCT Application No. PCT/EP2018/074804, filed Sep. 13, 2018, which claims the benefit of Great Britain Patent Application No. 1715367.7, filed Sep. 22, 2017, the entire teachings and disclosure of which are incorporated herein by reference thereto.

FIELD OF THE INVENTION

The present disclosure relates to an improved die and die body design and associated processes. In particular, the invention relates primarily to dies used in the preparation of samples for material analysis, including samples for subsequent spectroscopic analysis, and to the process for extracting prepared pellets from the die.

BACKGROUND TO THE INVENTION

Pressing, sintering and stamping techniques are used, for example in manufacturing and other industries, to shape, modify or form a sample of powdered or workable material by the application of sufficient force. Materials to be analysed by spectroscopy, for example, have to be prepared before loading into a spectrometer, in order to obtain the right optical properties, geometries and size, as well as suitable surface quality. The shape and dimensions of the pressed sample is determined by the shape and dimensions of a die in which the sample is pressed, the applied mechanical force being provided by a ram or plunger or similar component. In essence, a pressing process involves the introduction of a sample of powdered or workable material into a cavity or recess in the die, and under application of pressure, provided by the plunger, acting within the cavity on the sample, the sample is compressed and deformed within the cavity and adopts the shape and dimensions of the cavity. The structure and material of the die are sufficiently robust to ensure that the pressing process will achieve the required deformation under the pressing action of the plunger.

The material sample is formable, being in powder or malleable consistency, when it is first introduced into the die cavity. Normally the plunger and die assembly containing the sample are together loaded into a vice-like arrangement (the press), which provides the compressing force, applied, on one side, on the plunger and, on the other side, on the closed end of the die body containing the sample, or anvil. Under application of mechanical pressure by means of the plunger pressing the sample in the cavity, the sample deforms, particles coalesce and its hardness increases, sometimes considerably. The plunger and the then hard, solid sample form a tight fit with the cavity and it can be difficult to extract the sample from the closed end of the cavity into which the sample has been compressed.

One conventional solution to this extraction problem is to make the closed end of the cavity, the end where the material sample is compressed, openable, by means of a removable closure. In this arrangement the cavity extends from one end of the die body to the other, with the plunger entering the cavity at one cavity end and the sample being extractable from the opposite cavity end, when this end is open. The openable end of the die body must nevertheless, in its closed position, be capable of transferring and withstanding the considerable compressive forces applied by the external vice or press, via the plunger on the sample material and the die body. A common solution is to use a die body which is not a single integral body but two or more individual parts, the body being capable of dismantlement and, in this sense, openable, to extract the sample from the cavity.

Even under this arrangement extraction still usually requires the use of the external press to apply a force greater than can be applied by a human operator alone, via the plunger acting on the material sample, so that the sample may be displaced by the plunger though the then open end of the cavity die body. However, the force provided by the press to be exerted, at one side, on the plunger and, on the other side, on the then open end of the die body would then impinge directly on the sample itself, thereby damaging it. To facilitate the delivery of a force from the press to extract the sample without damaging it, an intermediate component, widely known as an "extraction cup tool", so called because it is a cylinder with one closed end, resembling a cup, is used: this transmits the force to the die body only, leaving a further cavity larger than the sample, allowing the plunger, acting under the same force, to push the sample out of the die body cavity where it is tightly fitting, through the then open end of the die body and into the larger cavity of the extraction cup without it being damaged by the press itself, and where the sample is now loose fitting and free and can subsequently be retrieved. Further details of this arrangement are described in later passages herewith.

OBJECTIVE TECHNICAL PROBLEM

Use of an extraction cup tool is nevertheless cumbersome and time-consuming, requiring manual intervention: deactivation of the press in order to allow the cup to be inserted and aligned, before re-activation of the press to displace the plunger which pushes the sample into the space created within the cup. The cup component is a separate component that cannot be present during the initial press cycle that forms the sample and may therefore also be mislaid or be used in another operation, which may lead to delays and interruptions. It is therefore an objective of the current invention to provide a single die assembly arrangement which eliminates the need for a separate cup or manual intervention in the extraction of material sample from the die, after it has been formed.

STATEMENT OF THE INVENTION

In order to overcome these and other acknowledged disadvantages and limitations with the state of the art, there is proposed a die arrangement for pressing, sintering or stamping comprising: a die body with a cavity extending from an opening at a first end of said die body to an opening at a second end of said die body. The die arrangement further comprises one or more moving parts arranged around the opening at said first end of said die body, wherein each moving part is displaceable between a first position and a second position.

In some embodiments, the or each moving part, when in the first position, is aligned perpendicular with the plane of the cavity opening at the first end of said die body, and wherein, in the second position, the or each moving part is aligned parallel to the plane of the cavity opening at the first end of said die body.

In some embodiments, the die body is configurable to receive a die plunger at said second end of said die body, said plunger being displaceable within the cavity.

In some embodiments, the die arrangement further comprises a first spring, wherein said die plunger is spring mounted in said second end of said die body by said first spring, said first spring being compressible during relative displacement between said die plunger and said die body.

In some embodiments, the die arrangement further comprises an outer sleeve mounted on the die body, the outer sleeve being coaxial with the die body and having a first outer sleeve portion nearest to the first end of said die body, and one of: a second outer sleeve portion nearest to the second end of said die body; a second outer sleeve portion fixedly attached to the plunger base nearest to the second end of said die body; or, a second outer sleeve portion extending directly from the plunger base nearest to the second end of said die body, the second outer sleeve portion and the plunger base being a single unitary component.

In some embodiments, the outer sleeve is displaceable on the die body between a first sleeve position and a second sleeve position, wherein in the second sleeve position the first outer sleeve portion is displaced to lie proximate to said first end of said die body.

In some embodiments, the or each moving part is mounted on the first outer sleeve portion.

In some embodiments, the die arrangement further comprises a second spring, wherein said first outer sleeve portion is spring mounted on one of said second outer sleeve portion or said die body by said second spring, said second spring being compressible during relative displacement between said second outer sleeve portion or said die body and said first outer sleeve portion.

In some embodiments, said second end of said die body comprises a plurality of grooves, and wherein at least one of said second outer sleeve portion or said die plunger further comprise one or more latches, said one or more latches being engageable with said grooves.

In some embodiments, when said one or more latches are engaged with said grooves, relative displacement between said die body, said die plunger, and said second outer sleeve portion is constrained, said one or more latches being held in said grooves by a third spring.

In some embodiments, the die arrangement further comprises an anvil, wherein said anvil is displaceable between an engaged position at said first end of said die body and a disengaged position away from said first end of said die body.

In some embodiments, the cavity at said first end of said die body is configured to receive and retain a malleable or powdered material sample prior to said die arrangement commencing pressing, sintering or stamping.

In some embodiments, the die arrangement further comprising a press, wherein said die body is retained within said press and wherein said press is configured to generate compressive pressure between said first end of said die body and said second end of said die body.

In some embodiments, a press integrally comprises the die arrangement according to the invention.

There is further proposed a method for pressing, sintering or stamping using a die arrangement, the method comprising the steps of: loading a sample into a die body, wherein said die body comprises a cavity extending from an opening at a first end of said die body to an opening at a second end of said die body, and wherein said sample is loaded into said first end of said die body; compressing said sample by applying a compressive force between said first end of said die body and said second end of said die body, the sample being retained within the cavity during compression; displacing one or more moving parts between a first position perpendicular with the plane of the cavity opening at said first end of said die body to a second position where the or each moving part is aligned parallel to the plane of the cavity opening at said first end of said die body; and, applying a compressive force between said one or more moving parts in said second position and said second end of said die body, wherein proximate to said first end of said die body said one or more moving parts in said second position provide a recess into which said compressed sample may by displaced, said compressed sample when displaced being freely extractable from said die arrangement.

BRIEF DESCRIPTION OF THE FIGURES

For a better understanding of the invention and in order to show how it may be implemented, references are made, purely by way of example, to the accompanying drawings in which like numerals designate corresponding elements or sections. In the accompanying drawings:

FIGS. 3A-3C are sectional views of a die in a conventional system during extraction;

Figure 4:
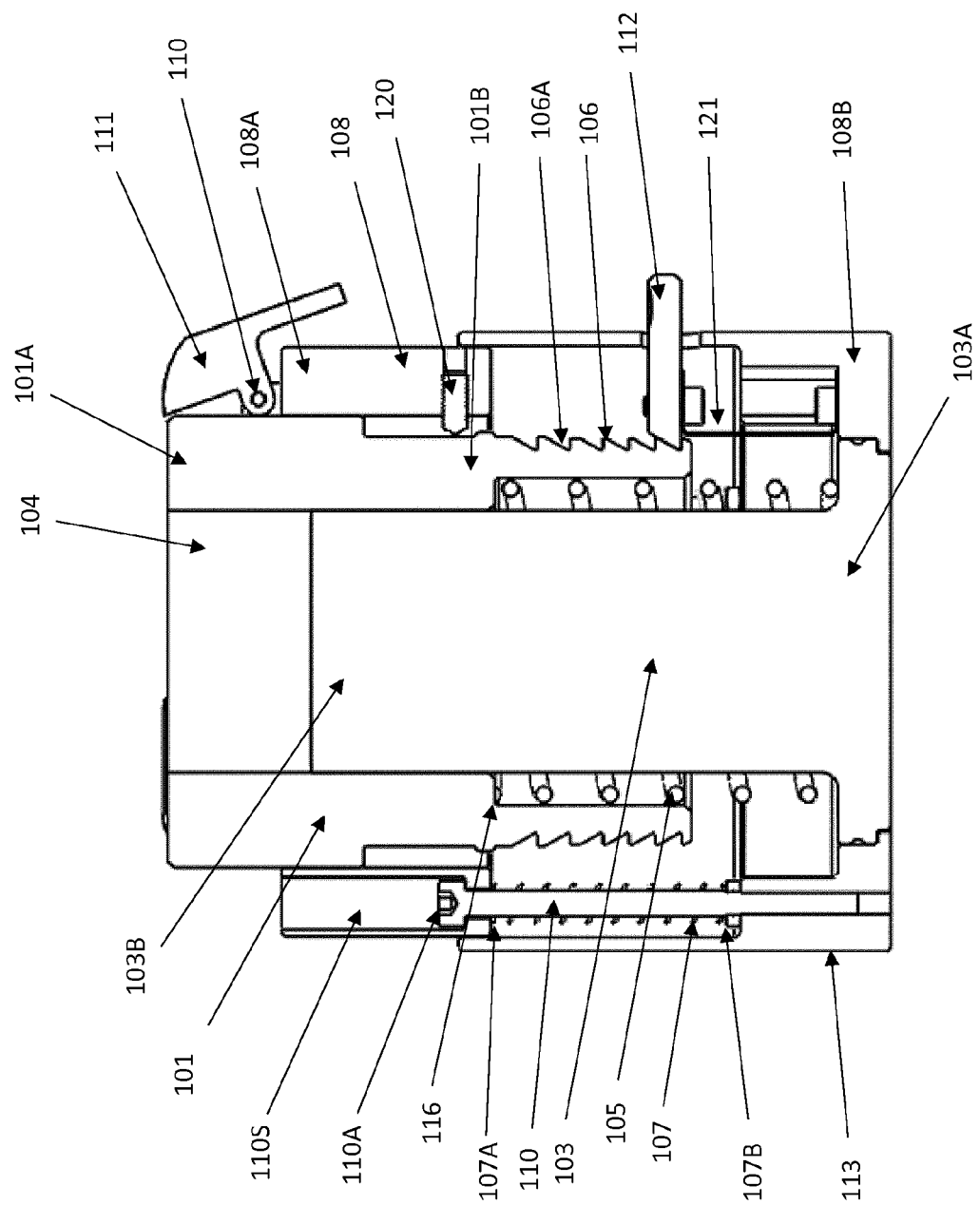
Figure 5C:
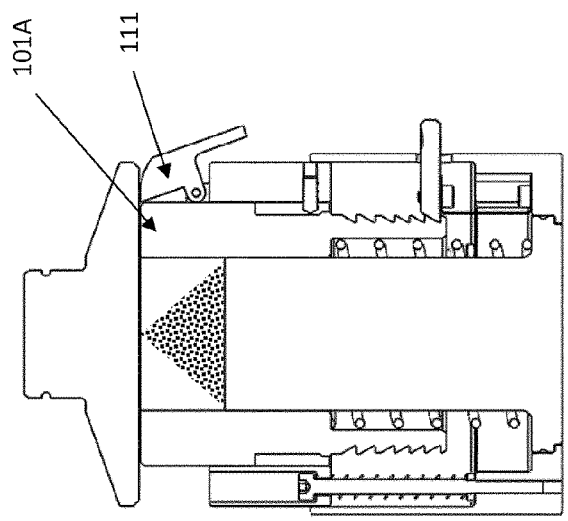
Figure 5B:
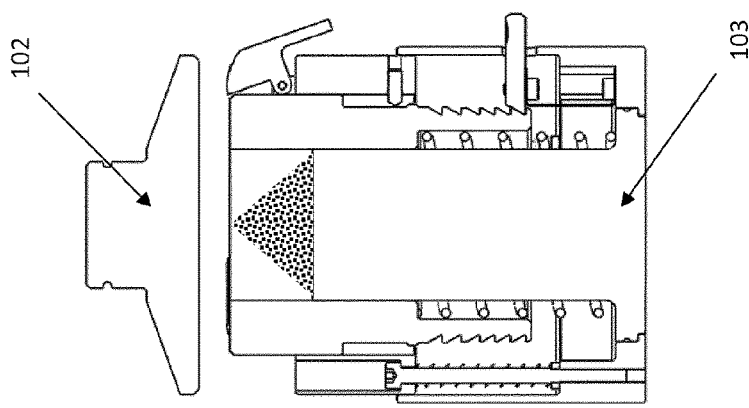
Figure 5A:
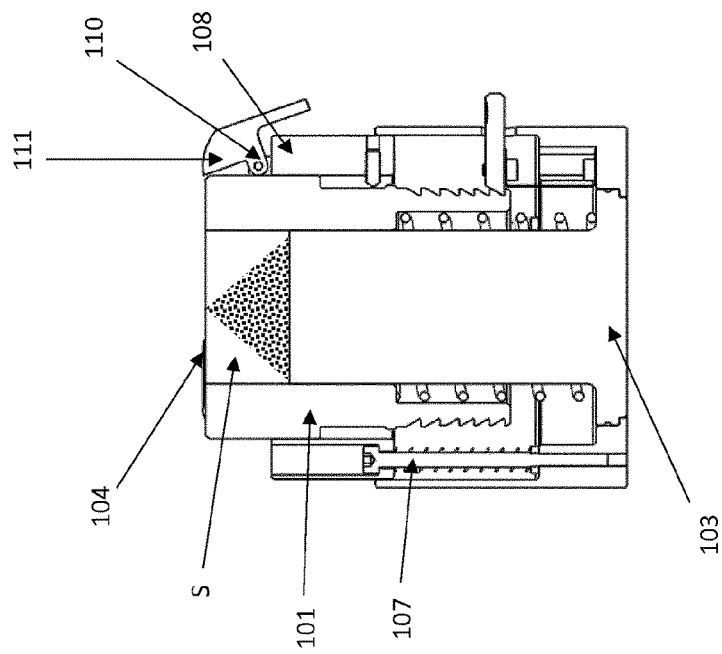
Figure 7C:
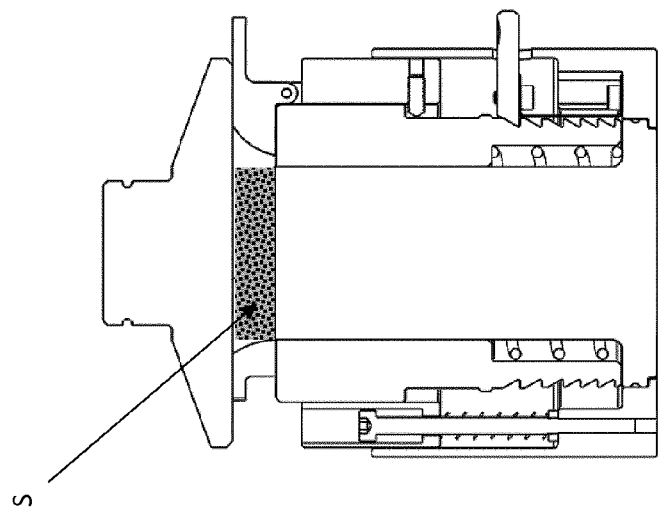
Figure 7B:
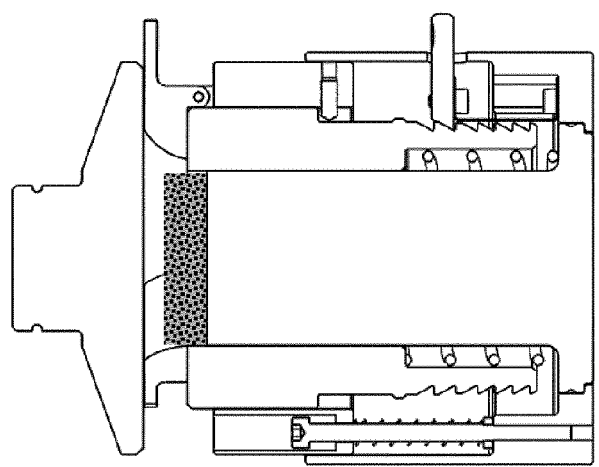
Figure 7A:
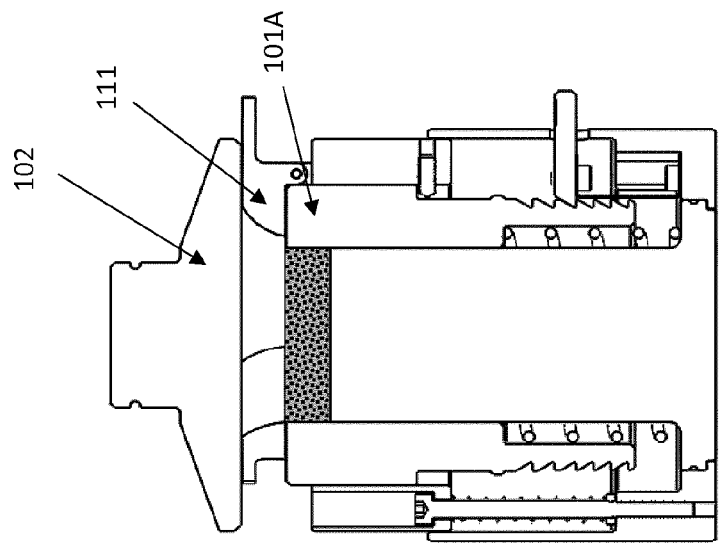
Figure 8C:
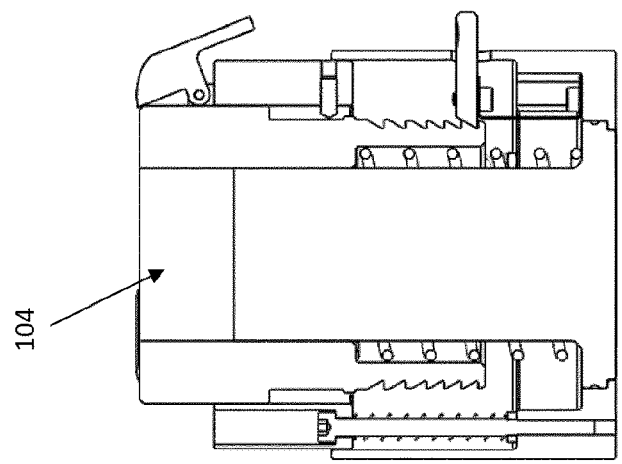
Figure 8B:
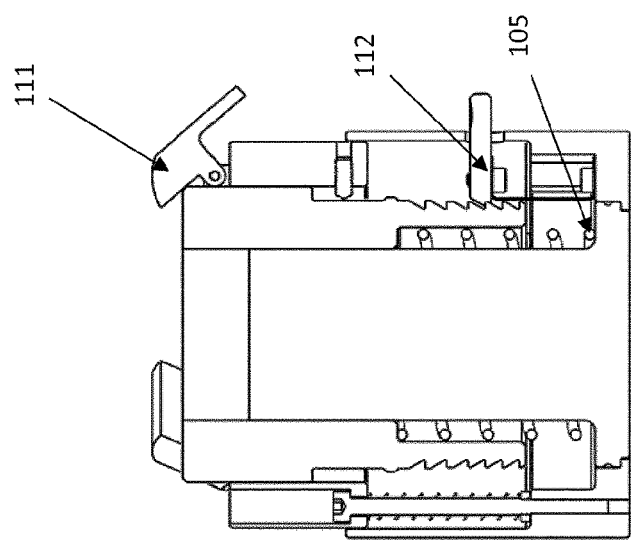
Figure 8A:
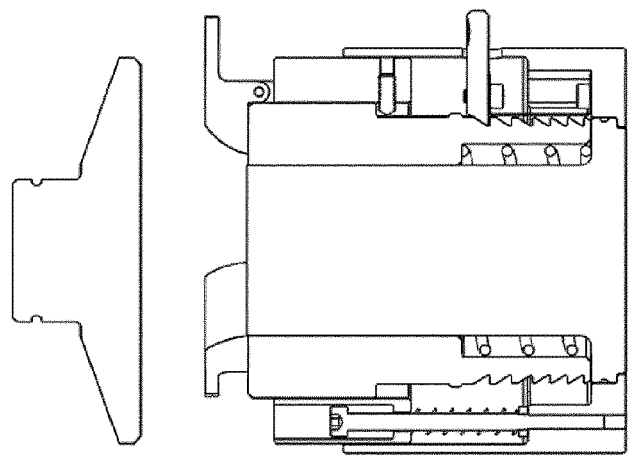
Figure 9C:
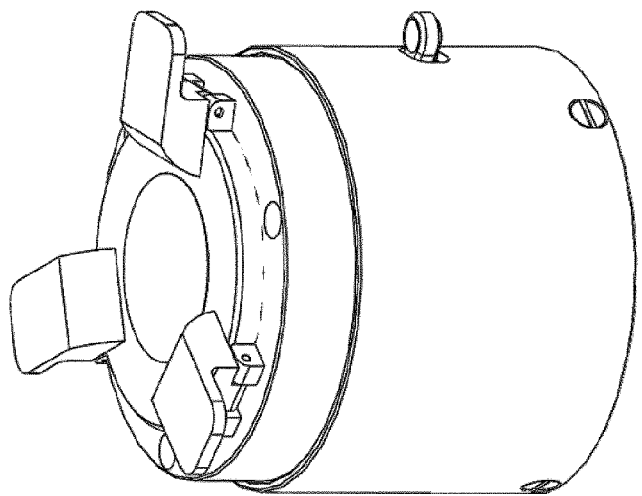
Figure 9B:
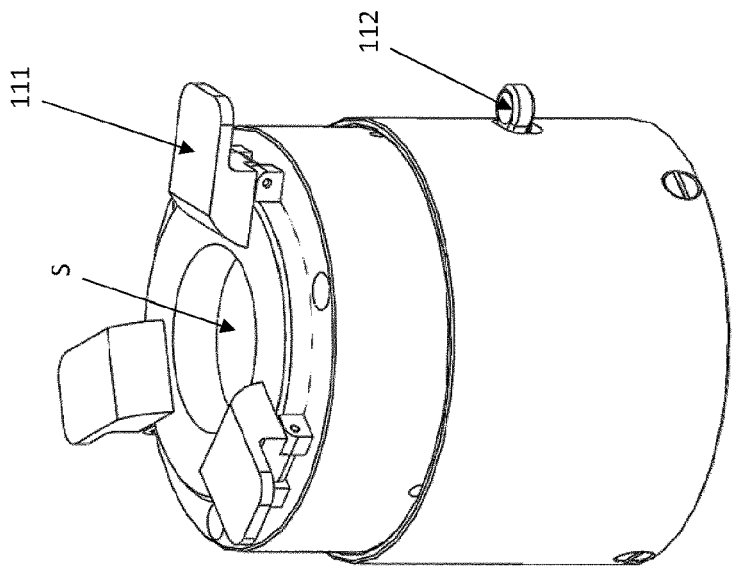
Figure 9A:
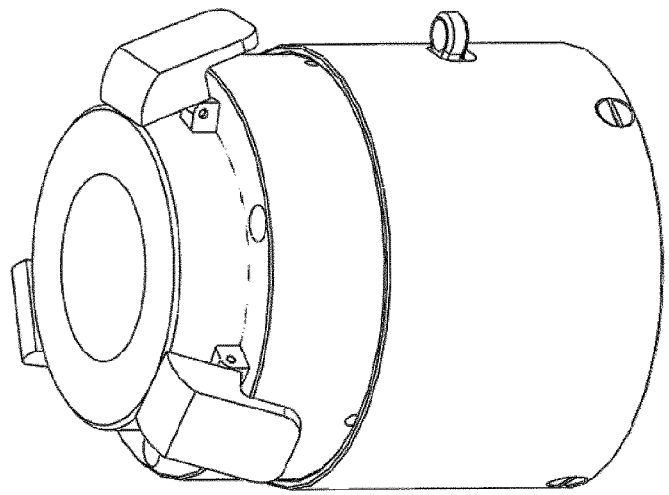
Figure 10C:
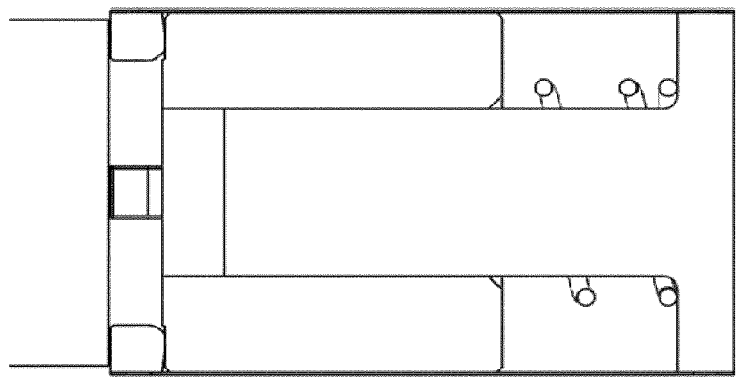
Figure 10B:
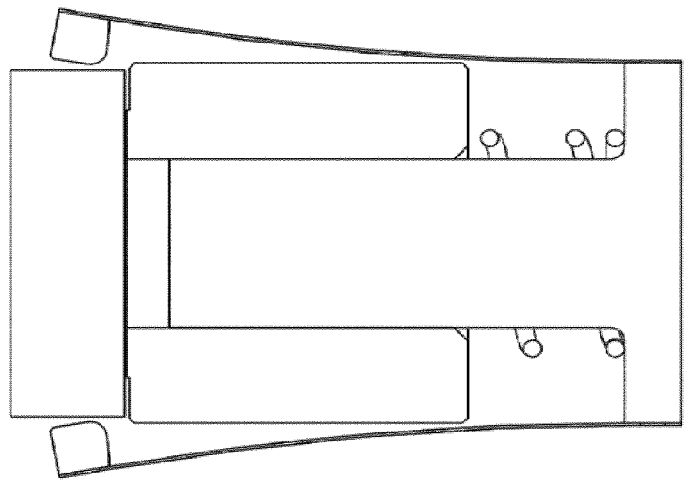
Figure 10A:
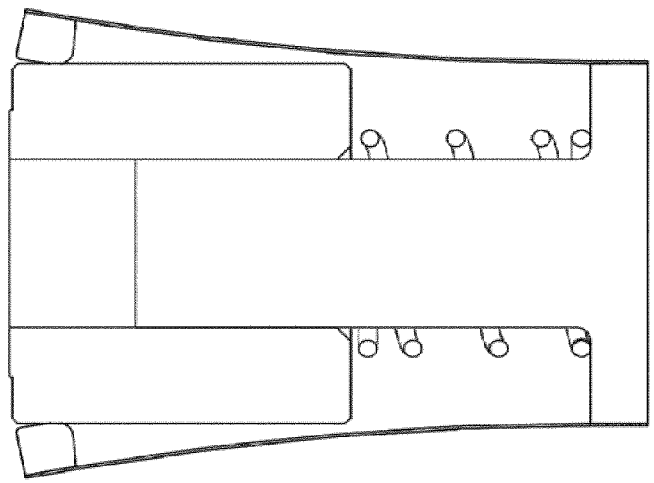
Figure 11C:
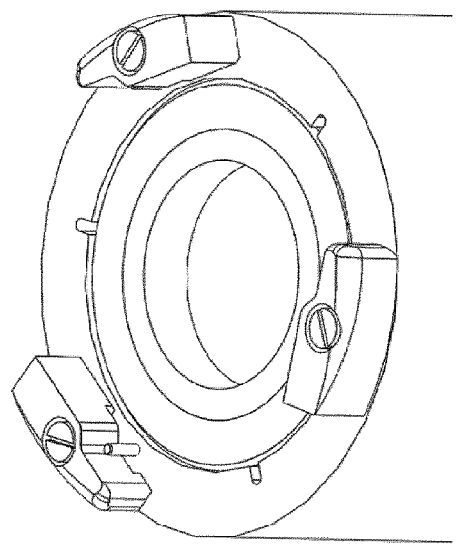
Figure 11B:
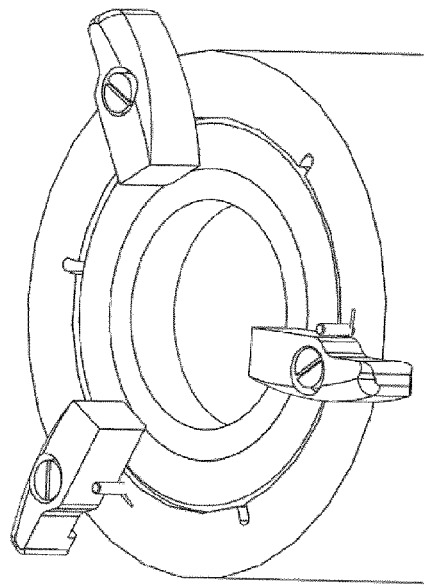
Figure 11A:
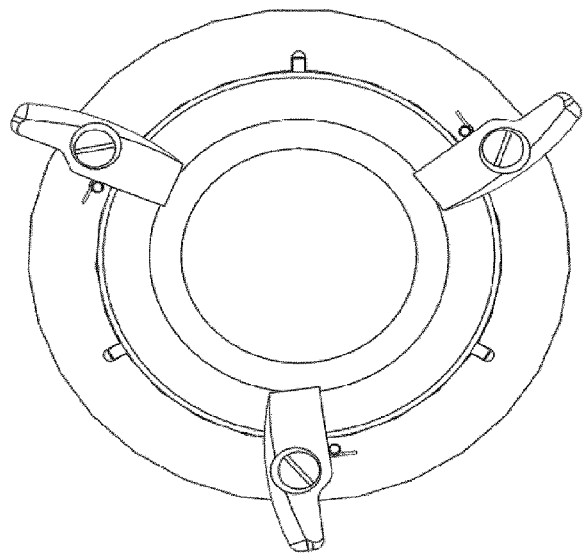
Figure 12B:
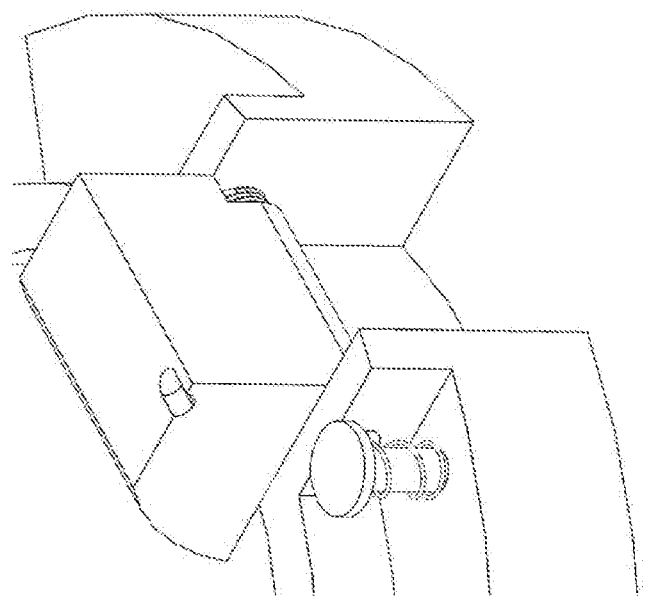
Figure 12A:
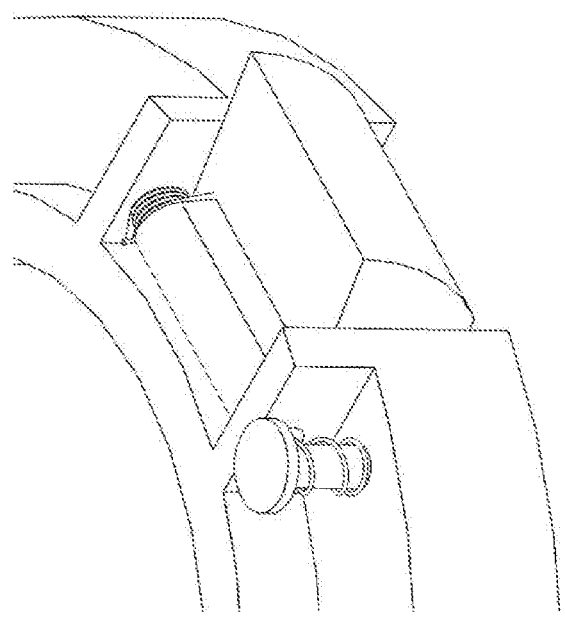
Figure 16:
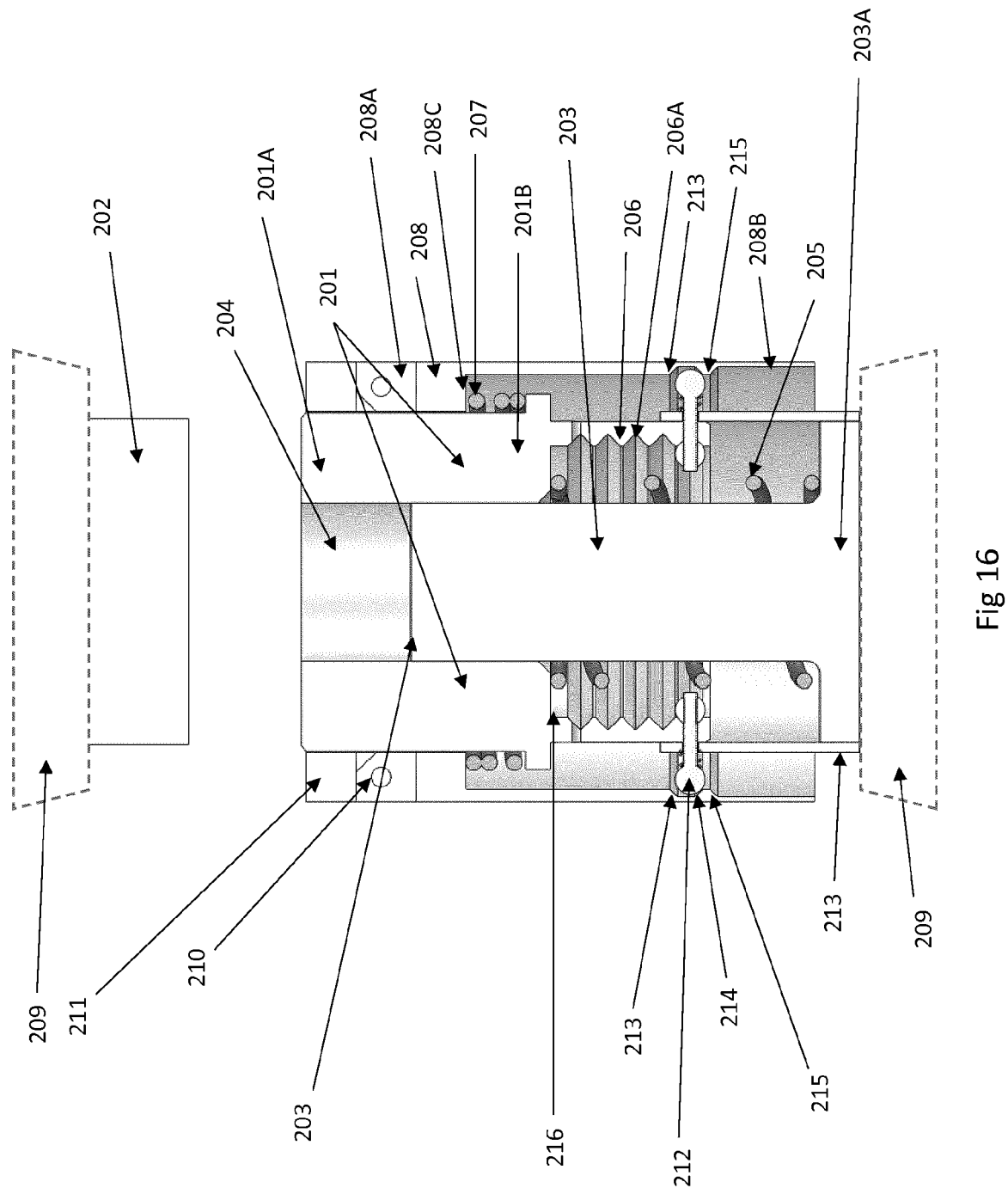
Figures 17A, 17B, 17C:
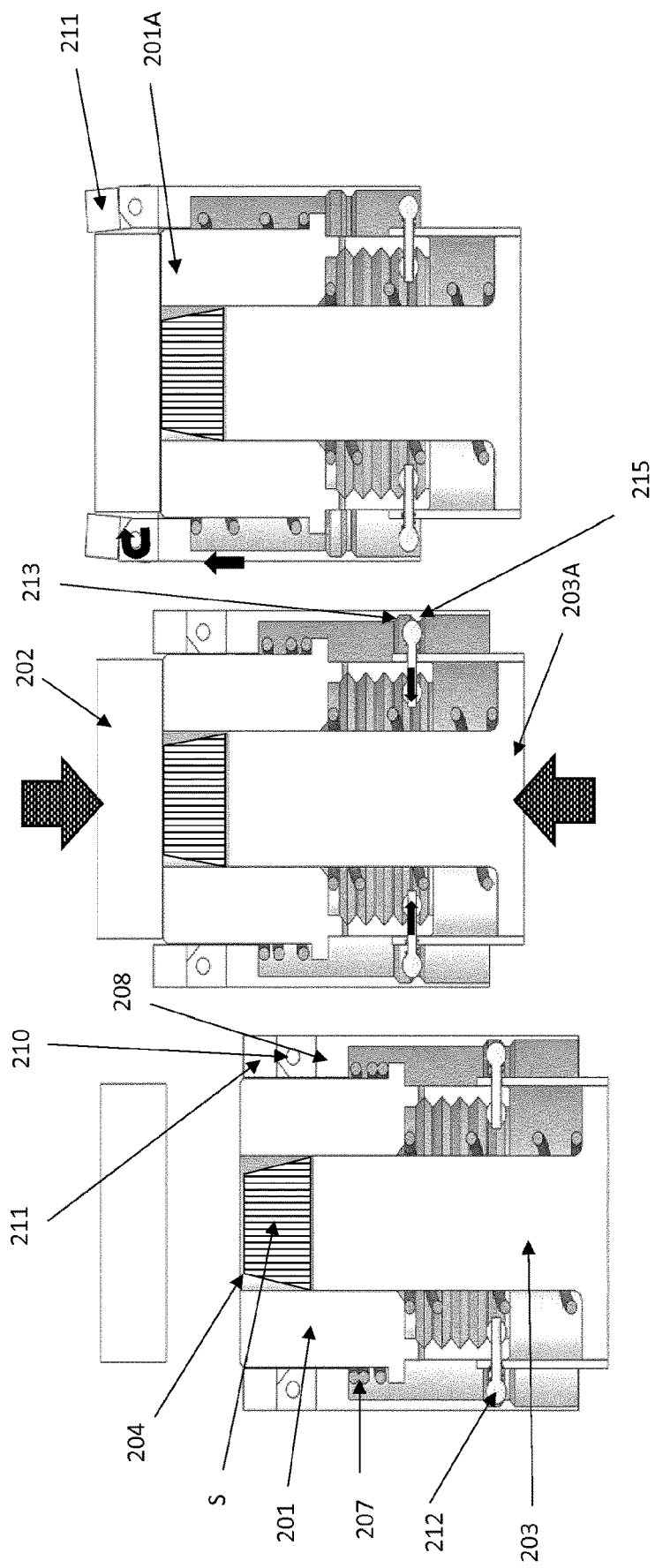

The remaining figures illustrate operation of a die press according to the invention;

FIG. 4 is a sectional view of the die press according to an embodiment of the invention;

FIGS. 5A-5C are sectional views of a die press according to an embodiment of the invention with sample loaded;

FIGS. 6A-6C are sectional views of a die press according to an embodiment of the invention during compression and release;

FIGS. 7A-7C are sectional views of a die press according to an embodiment of the invention during extraction;

FIGS. 8A-8C are sectional views of a die press according to an embodiment of the invention as it is reset;

FIGS. 9A-9C are 3D views of a die press according to an embodiment of the invention;

FIGS. 10A-10C are sectional views of a die press according to an embodiment of the invention comprising spring fingers;

FIGS. 11A-11C are 3D views of a die press according to an embodiment of the invention comprising latches rotatable about the Z-axis;

FIGS. 12A-12B are 3D views of a die press according to an embodiment of the invention comprising latches rotatable about the X-axis;

FIGS. 13A-13D are sectional views of a die press according to an embodiment of the invention comprising a latching outer sleeve;

FIGS. 14A-14D are sectional views of a die press according to an embodiment of the invention comprising linear sliding fingers;

FIGS. 15A-15D are sectional views of a die press according to an embodiment of the invention comprising extendable columns;

FIG. 16 is a sectional view of the die press according to an alternative embodiment of the invention;

FIGS. 17A-17C are sectional views of a die press according to an alternative embodiment of the invention with sample loaded;

FIGS. 18A-18C are sectional views of a die press according to an alternative embodiment of the invention during compression and release;

FIGS. 19A-19C are sectional views of a die press according to an alternative embodiment of the invention during extraction;

FIGS. 20A-20C are sectional views of a die press according to an alternative embodiment of the invention as it is reset.

DETAILED DESCRIPTION OF THE FIGURES AND EMBODIMENTS

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

In reference to the figures dies are generally cylindrical in shape (but may have other geometries), with a cavity, which may be coaxial with the die.

Figure 1C:
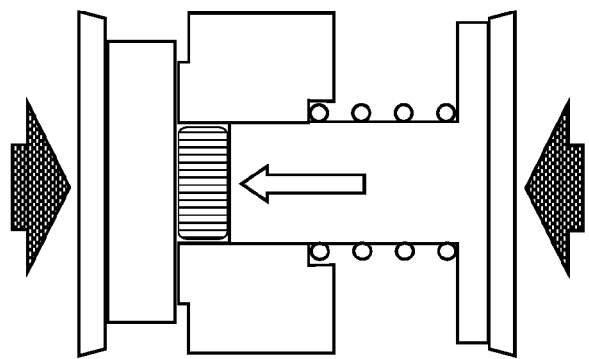
FIGS. 1A-1C are sectional views of a die in a conventional system with sample loaded therein prior to compression.
Figure 1B:
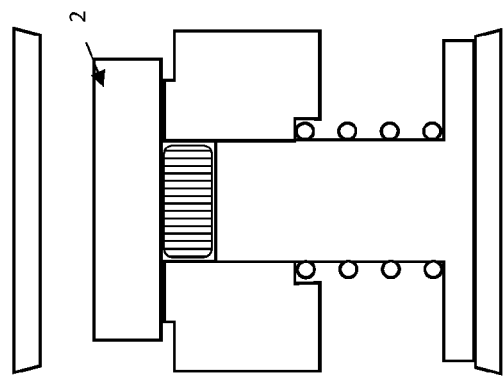
Figure 1A:
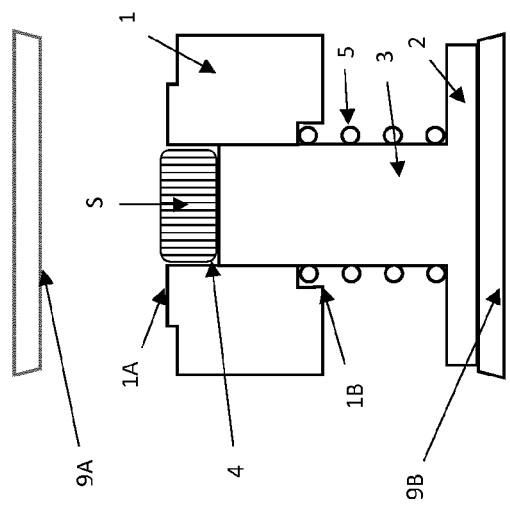

FIGS. 1 to 3 show the operation of a die in a conventional system. In its simplest form the die is a cylindrical body having a cavity (4) running from a first end (1A) to a second end (1B) of a die body (1), as shown in FIG. 1A. The cavity (4) being closed at the first end (1A) by an integral die base (not the arrangement shown in the figures) or, in alternative arrangements, as shown in FIGS. 1 to 3, comprises a die body (1) and die base (anvil) (2) which are not a single integral component, but two distinct components. In this configuration, the anvil (2) engages with the first end (1A) of the die body (1) and effectively seals off the cavity at the first end (1A): the anvil (2) may present a circular surface for engagement with the annular end surface at the first end (1A) of the die body (1). The cavity (4) is configured to receive a plunger (3) at the second end (1B) of the die body (1) and permit relative movement of the plunger (3) with respect to the cavity (4) in a longitudinal or axial direction between the two ends.

The plunger (3) and the die (1,2) may be together placed within a press (9) which can deliver a compressive force to push the plunger (3) into the cavity (4) of the die body (1). The figure shows the external press parts (9A, 9B) that provide the compressive force that is transmitted to the die assembly and the sample at the top and bottom of the FIGS. 1 to 3. In this configuration the anvil (2) is shown separate from the press part (9A) such that it must be placed or removed manually. In other configurations the anvil (2) may be attached to press part (9A) such that they move in unison at all times. In other configurations the anvil (2) may be substituted entirely by suitable modification of the press part (9A). Note that regardless of motion shown in diagrams, in reality either press part (9A) or (9B) can move alone relative to the other or, alternatively both (9A) and (9B) can move simultaneously to provide the compressive force to the plunger/die assembly (1,2,3).

Material (S) to be compressed is usually in a formable or malleable form, e.g. in powder form, that can be easily loaded into the cavity (4) in the die (1,2): FIG. 1A shows the die body (1) with the anvil (2) detached and the sample (S) already loaded and FIG. 1B shows the loaded die (1,2) closed by the detachable anvil (2), with the anvil (2) located on the first end (1A) of the die body (1).

Figure 2C:
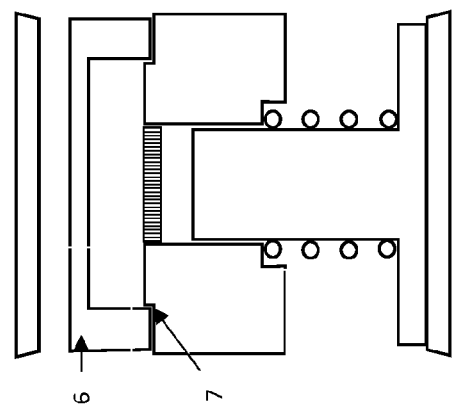
FIGS. 2A-2C are sectional views of a die in a conventional system during the compression and compression release.

When the die (1,2) is loaded with a sample (S) and the compressive force provided by the press (9) is applied (solid arrows in FIG. 1C), the plunger (3) is displaced within the cavity (4), as shown by the non-filled arrow in FIG. 1C, and the compressive force is transmitted, via the die (1,2) and plunger (3), to the sample (S). The sample (S) is then compressed, as shown in FIG. 2A.

In some applications extra loose parts are added on one or both sides of the sample, e.g. between sample (S) and anvil (2) and/or between sample (S) and plunger (3). These are most commonly solid discs which have a high quality surface finish. The aim of these parts is to transfer their high quality surface finish to the sample which may be important for subsequent analysis of the sample by spectrometer or other means. They also serve as a sacrificial part in the sense that if they are damaged, only those parts require replacement, rather than the anvil (2) or the plunger (3) which may be costly and time consuming to replace, they being larger and more integrated into the assembly. Another purpose for these loose parts is to render the contact surface with the sample of a certain material which does not lend itself to the manufacture of the anvil (2) or plunger (3). This material may be important to prevent contamination of the sample surface with the material of the anvil (2) or plunger (3). These parts are designed to withstand the pressures involved without significant deformation, such that they always remain a loose fit within the die cavity (4), and hence are always easy to remove. In the context of this description, they can be thought of as simple extensions of the anvil (2) and/or plunger (3) and do not affect the mode of operation of the device. In other configurations the sample may be also be placed in a light aluminium sample holder. This device is usually of the form of a thin section aluminium cup of similar shape to the die cavity (4) cross section. The holder is deformed along with the sample, and indeed becomes permanently attached to the compressed sample. Its purpose is to support the compressed sample during and after extraction from the die cavity, and to prevent the sample becoming damaged by subsequent processes or handling.

Figure 2B:
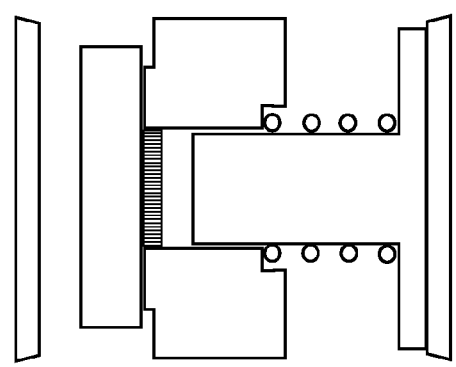
Figure 2A:
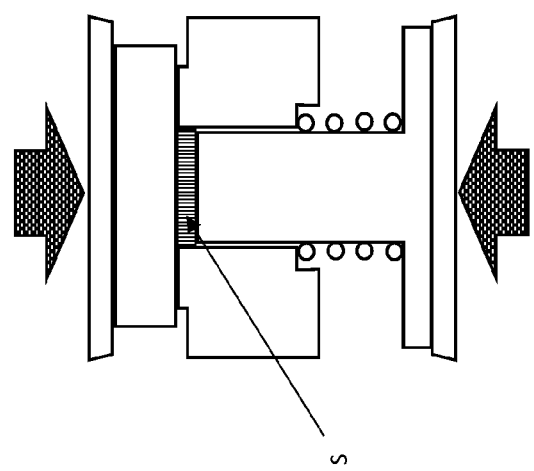

When the pressure is released, as shown in FIG. 2B the die (1,2) is removed from the plunger (3) by the action of a spring (5) and a void is formed between the retracted plunger (3) and the sample (S), which is effectively jammed at the compression location within the cavity (4) of the die body. The anvil (2) can be removed to expose the sample (S), but having undergone such considerable pressure, the compressed sample (S) may be stuck fast in the cavity (4) of the die (1,2) and may be difficult to extract. In order to aid extraction a cup tool (6) is applied to the die body (1) at a first end (1A) thereof, the first end (1A) of the die body (1) having a circular locating recess (7) to receive the corresponding surface in the rim of the cup tool (6) as shown in FIG. 2C. In other configurations, the cup tool may be aligned manually. The cup tool (6) is broadly cylindrical in shape and is closed at the one end and open at the other end, the open end (or rim at the open end) being dimensioned to engage with the annular surface of the first end (1A) of the die body (1). With the cup tool (6) in place, and the rim thereof engaged with the first end (1A), the press is activated again and the pressure applied to the die/plunger combination (1, 2, 3), as depicted by the solid arrows in FIG. 3A. The spring (5) is compressed again, forcing the plunger (3) to be displaced within the cavity (4) and pushing the sample (S) out of the cavity (4) into the space formed within the cup tool (6), FIG. 3B. The plunger (3) displaces the sample (5) by an amount to provide clearance of the sample (S) beyond the first end surface of the die body (1): the sample (S) emerges out of the end of the cavity (4).

In this way, the cup tool (6) facilitates the extraction of the sample from the cavity (4) in the die body (1). By removing the cup tool (6) the sample (S) can be accessed and removed by manual intervention (FIG. 3C). Optional slots or grooves in the end surface of the die body (1) at its first end (1A) permit greater access to the sample (S) and aid extraction, as illustrated in FIG. 3C.

The aforementioned arrangement relies on the use of the cup tool (6) to transmit the compressive force from the press (9) to move the plunger (3) and displace the compressed material sample (S). This requires an interruption in the process, the insertion of the cup tool (6) and its alignment on the die body (1), as well as its removal. This is inconvenient to the operator and the current invention provides an improvement on the previously described arrangement which eliminates these shortcomings.

With reference to FIG. 4, which shows an embodiment of a die according to the invention. The die may be generally cylindrical in shape (but may have other geometries), with a cavity, which may be coaxial with the die. An arrangement, comprising a die body (101) and the die base or anvil (not shown), not as a single integral component, but as two distinct components, is shown in FIG. 4. The cavity (104) is configured to receive a plunger (103) and permit relative movement of the plunger (103) with respect to the cavity (104). The plunger (103) and the die body (101) may be together placed within a press (not shown) which can deliver a compressive force to push the plunger (103) into the cavity (104) of the die body (101).

The die body (101) is supported by a first helical spring (105) upon the base (103A) of the plunger (103) which facilitates relative movement between the plunger (103) and the die body (101). With no pressure applied by the press, the spring position aligns the first end (101A) of the die body (101) above the first end (103B) of the plunger (103), thereby creating a well at that end of the cavity (104) for receiving sample material (S).

At its second end (101B) the die body (101) is joined to a cylindrical section (106) which is coaxial with the die body (101) and plunger (103). The cavity (104) in the die body extends into the cavity in the cylindrical section (106), the diameter of the cavity (104) in the cylindrical section (106) being greater than the diameter of the cavity (104) in the die body (101), thereby providing a space in which the first helical spring (105), surrounding the core of the plunger (103), is located. As the first helical spring (105) is compressed or stretched, due to relative movement of the die body (101) and the plunger (103), the movements of the first helical spring (105) can be accommodated within this space. The die body and the cylindrical section are formed as a single integral element (or permanently fixed to each other) such that they move in unison.

Depending on user requirements, the compressive force generated by the plunger (103) may be as much as 40 tonnes, however it will be appreciated that in some embodiments a greater or lesser compressive force may be generated. Further, the extractive force required to dislodge or remove compressed samples that have become jammed or stuck in cavity (104) may be as much as 2 tonnes, however it will be appreciated that in some embodiments a greater or lesser extractive force may be required and generated.

The operation of an embodiment of the die according to the invention is illustrated in FIGS. 5 to 8. These figures can be interpreted as generally showing movement of the plunger base and plunger, as well as that of the die body, with respect to the anvil, which remains stationery throughout: this is for illustrative purposes only. The invention covers all relative movement between these components and is not limited to configurations in which the anvil is stationery.

The figures show embodiments in which the levers are mounted on a sleeve (108) or a portion (108A, 108B) of a sleeve, but the invention includes other embodiments where the levers are instead embodied as moving parts, or where the levers or moving parts are mounted onto or about other components: the invention as claimed is not limited to embodiments comprising levers mounted on the sleeve. It will therefore be appreciated that some embodiments of the invention include arrangements where levers or moving parts are mounted directly onto the die body (101). Typically, such arrangements will require the levers or moving parts to be mounted directly onto the first end (101A) of the die body (101), as exemplified in FIGS. 14 and 15. Other arrangements may however include levers or moving parts mounted about or onto the second end (101B) of the die body (101), or onto other parts such as the base (103A) of plunger (103), as exemplified in FIG. 10.

FIG. 5A shows a die/plunger arrangement (101, 102, 103), the die comprising a die body (101) with a cavity (104), for receiving a tightly fitting but displaceable plunger (103) and a removable die anvil (102, FIG. 5B). The die body (101), the anvil (102), the cavity (104) and the plunger (103) may be broadly cylindrical, but other geometries are also envisaged. The cavity (104) and plunger (103) may be coaxial with the die body (101) and anvil (102), such that the removable die anvil (102) can sit on the surface of the first end (101A) of the die body (101). The surface of the first end (101A) of the die body (101), which surface is annular in shape, and surface of the anvil (102) may be shaped to ease alignment and accommodation of one component to the other, i.e. by recesses, slots, grooves or other surface feature, on one surface, with corresponding feature on the other surface. The plunger (103) is formed as an integral component with a plunger base (103A). Movement of the plunger (103) in the cavity (104) of the die body (101) is guided and controlled by the first helical spring (105) which surrounds the core of the plunger (103). The first helical spring (105) is in mechanical communication with the plunger base (103A) and the inner flange (116) at the second end (101B) of the die body (101), such that it supports the die body (101) on the plunger base (103A): when the plunger (103) is depressed into the cavity (104) by means of a compressive force, the first helical spring (105) exerts a counterforce in the opposite direction.

The arrangement may further comprise an outer sleeve (108), arranged around the die body (101) and being spring-loaded, as described herein. The outer sleeve (108) is broadly cylindrical in shape, although other appropriate geometries are envisaged. The outer sleeve (108) may coaxially surround die body (101), and may feature a first outer sleeve portion (108A) and a second outer sleeve portion (108B). The second outer sleeve portion (108B) may be fixedly attached to plunger base (103A) thereby ensuring that the outer sleeve portion (108B) and the plunger base (103A) move in unison relative to the die body (101) during operation of the die. In alternative embodiments, the second outer sleeve portion (108B) may extend directly from plunger base (103A) to form a single unitary component. The outer sleeve (108) may contain, or the first and second outer sleeve portions (108A, 108B) may be connected by, one or more second helical springs (107) such that the first outer sleeve portion (108A) is spring-loaded with respect to the second outer sleeve portion (108B). The or each second helical spring (107) may be mounted about a shaft (110) where the or each shaft (110) extends between a shaft recess (110S) and the second outer sleeve portion (108B). The first end (107A) of the or each helical spring (107) may abut with a doorway or restrictor at the point where the or each shaft (110) enters shaft recess (110S). The second end (107B) of the or each helical spring (107) may abut with a doorway or restrictor at a point where the or each shaft (110) extends into the second outer sleeve portion (108B). In a resting state, such as when plunger (103) is not in operation, the or each second helical spring (107) may reside in an uncompressed or substantially uncompressed state. In such an uncompressed state, the or each second helical spring (107) may provide a negligible, or otherwise nil, force on the outer sleeve (108) and the shaft head (110A) of shaft (110) may rest upon, or be restricted from further movement by, the doorway or restrictor at the point where the shaft (110) enters shaft recess (110S). When the second helical spring (107) is compressed, such as due to operation of the plunger (103), the shaft head (110A) of shaft (110) may be displaced along shaft recess (110S). The maximum extension of the or each shaft head (110A) into shaft recess (110S) may be defined or restricted by one or more extension restrictor (120). It will be appreciated that the or each extension restrictor may be embodied as a grub screw, and may abut a flange on die body (101). It will further be appreciated that the or each shaft head (110A) and shaft recess (110S) may be defined to limit the position of the die body (101) relative to the outer sleeve (108). In this way, the first outer sleeve portion (108A) may be prevented from rising beyond a certain distance from the second outer sleeve portion (108B). In an alternative embodiment, the or each spring shaft arrangement may be reversed in orientation and the or each shaft head may extend into a shaft recess in the second outer sleeve portion (108B), this giving substantially the same functionality.

The arrangement comprises a ratchet mechanism, said ratchet mechanism comprising section (106) at the second end (101B) of the die body (101) and one or more displaceable latches (112) attached to the second outer sleeve portion (108B), or in some embodiments to the unitary plunger base (103A) and second outer sleeve portion (108B) component. The outer surface of die body section (106) has a series of parallel grooves or indentations (106A) and the or each latch (112) is configured to communicate with the parallel grooves, which each serve as the "ratchet" to the latch's "pawl". The position of the die body (101) relative to the plunger (103) may be temporarily fixed by engaging at least one latch (112) with a recess or groove (106A) on the outer surface of the die body (101), effectively "locking" it in position. The or each latch (112) may be pivotably or linearly engageable with the or each groove (106A) and may be retained in place by one or more latch springs (121). When the latch is released, such as through displacement of the latch (112) in opposition to the retaining force of latch spring (121), the die body is effectively "unlocked" to move under the action of the first spring (105). The ratchet mechanism acts in combination with the first helical spring (105), the second helical spring (107), the extension restrictor (120), and the shaft head (110A) to hold the die body at any given position relative to the plunger (103).

FIG. 5A illustrates the die body (101) with uncompressed material sample (S) already loaded in the recess (the part of the cavity (104) not occupied by the plunger (103)) by the end of the plunger (103) and the inner surface of the die body (101). It will be appreciated that during operation, the stages of which are depicted in FIGS. 5-8, the or each latch (112) may be displaced on grooves (106A) of the ratchet mechanism to compress the first helical spring (105). Where anvil (102) is positioned about the cavity (104), compression of the first helical spring (105) may cause compression of the or each second helical spring (107) and thereby also cause shaft head (110A) to extend into shaft recess (110S). Where anvil (102) is not positioned about the cavity (104), compression of the first helical spring (105) may not cause compression of the or each second helical spring (107). In such a situation, the retaining force of the or each second helical spring (107) may instead cause the first outer sleeve portion (108A) to rise relative to die body (101) and thereby displace the outer sleeve (108) along the outer surface of the die body (101), such that the first end (101A) of the die body is broadly at the same level or adjacent the first outer sleeve portion (108A). The material (S) is loaded in a malleable or formable format, for example in powder form.

In the exemplary embodiment depicted in FIGS. 5-8, the outer sleeve (108) comprises, at the first outer sleeve portion (108A), a plurality of pivotable levers (111), each of which may be rotated about a pivot (110), the pivots being located around the circumference of the first outer sleeve portion (108A). The levers (111) may be, collectively or individually, angularly displaced around their respective pivots (110) and may be aligned in a first lever position, parallel to the axis of the outer sleeve (108) or perpendicular to it, in a second lever position, or at any angular displacement between these two extremes. The angular displacement of the pivotable levers (111) may be manual (i.e. manual rotation by the operator) or motorised, and may be automated within the sequence of movements described herein. When the first outer sleeve portion (108A) is located adjacent to the outer surface of the die body (101) in a first sleeve position, the pivotable levers (111) are aligned longitudinally i.e. parallel to the axis of the die body (101) and the axis of the outer sleeve (108). This is to say that the pivotable levers (111) are aligned perpendicular to the plane of the cavity opening at the first end of the die body. In this first position of the outer sleeve (108), the levers may extend the length of the outer sleeve (108), and may be prevented from rotating to the second lever position by the outer surface of the die body (101) or the outer perimeter of the anvil (102). If not blocked by the outer surface of die body (101) or the anvil (102) (see below), the pivotable levers (111) may be rotated to a second lever position and may be aligned perpendicular to the axis of the die body (101). The or each pivotable lever (111) in this second lever position lie across the end surface at the first end (101A) of the die body (101) and along a radius of the annular first end of the die body (101), parallel to the plane of the cavity opening at the first end of the die body. The or each pivotable lever (111) are formed of a robust material and are structured to withstand the pressures exerted by the press (not shown) and to transmit those forces from the anvil (102) to the die body (101). The length of the or each pivotable lever (111) is shorter than that of the thickness of the die body (101) such that, in the second lever position, the or each pivotable lever (111) extends radially toward the centre of the opening of the cavity (104) but does not overlap with said opening.

In FIGS. 5B and 5C, anvil (102) is positioned on or about the first end (101A) of the die body (101). The compressive pressure generated between the plunger (103) and the anvil (102) arises when a press (not shown) acts on either or both of the plunger base (103A) and anvil (102). The latch (112) may be engaged in grooves (106A) of the ratchet mechanism when the magnitude of force applied by the press reaches requisite levels. It will be appreciated that engagement of the latch (112) into grooves (106A) closer to the first end (101A) of die body (101) will require a greater application of press force than those further from the first end (101A). In alternative embodiments of the present invention, the compressive pressure may be generated by shifting latch (112) successively, or selectively, between grooves (106A) through use of a crank, motor, or other appropriate means, thereby obviating a need for a press acting on either or both of the plunger base (103A) and anvil (102).

As the press compresses the die assembly as depicted in FIG. 6, the or each latch (112) is displaced from grooves (106A) further from the first end (101A) of die body (101) and re-engaged in grooves (106A) closer to the first end (101A). It will be appreciated that during a disengaged state, the die body (101) may be significantly biased by the or each first helical spring (105). The force exhibited by the press must therefore remain present during the procedure of transitioning between grooves (106A).

When latch (112) is securely engaged in a groove (106A) closer to the first end (101A) of die body (101), as depicted in FIG. 6A, the first helical spring (105) will be compressed between the plunger base (103A) and the inner flange (116) of the die body (101). In order to achieve such a secure engaged position, the press (not shown), crank (not shown), motor or other appropriate means must force the plunger (103) to compress the material sample (S) against the anvil (102) within the die body cavity (104). The volume of the sample material (S) must also be reduced by the compressive force and thereby adopt the varying dimensions and shape of the void in the cavity (104) between the distal end of the plunger (103) and the anvil (102). When the plunger (103) is sufficiently depressed in cavity (104), the latches (112) may be engaged with grooves (106A) thereby locking the die body (101) in a secure engaged position about the plunger (103). Following compression, it will be appreciated that forces acting between compressed samples and the die body (101) will be sufficient to hold the compressed sample in place between the walls of the cavity (104), even when the plunger (103) is withdrawn.

In a secure engaged position of the type depicted in FIG. 6A where the anvil (102) is in place, the first outer sleeve portion (108A) is positioned proximate to the first end (101A) of the die body (101) and the pivotable levers (111) extend in a first lever position, i.e. parallel to the outer sleeve (108). The or each second helical spring (107) is compressed and biased, and the or each shaft head (110A) extends into the or each shaft recess (110S). Motion of the first outer sleeve portion (108A) relative to the die body (101) is constrained due to the presence of anvil (102). At FIGS. 6B and 6C the compressive pressure is removed and anvil (102) is distanced from the die body/plunger (101,103) combination, or vice-versa, in order to access the compressed material sample (S). As the anvil (102) is removed, the bias of the or each compressed second helical spring (107) forces the first outer sleeve portion (108A) to move relative to the die body (101), the die body (101) remaining close to its previous position due to the one or more latches (112). The maximum extent of this movement may be constrained by the or each extension restrictor (120) in one direction, or by the or each shaft head (110A) in the other direction, the or each shaft head (110A) being unable to move beyond the doorway between where the or each shaft (110) enters a shaft recess (110S).

As mentioned above, a problem frequently encountered at this point is that the compressed material sample (S), although accessible after the anvil (102) is removed, is stuck hard in the recess formed in the cavity (104) and the plunger (103) and is difficult to extract. In accordance with the invention the problem is solved as described in the following paragraphs, without resorting to use of a cup tool.

When the second outer sleeve portion (108B) and plunger (103) are securely engaged, via latches (112), in a position of sufficient compressive force, the bias of the or each compressed second helical spring (107) will move the first outer sleeve portion (108A) until the or each extension restrictor (120) abuts a flange on die body (101). In such a position, the first outer sleeve portion (108A) is proximate to the first end (101A) of the die body (101). As shown in FIG. 6B, when the anvil (102) is removed and the first outer sleeve portion (108A) moves relative to the die body (101), the pivotable levers (111) are free to rotate (ie the pivotable levers (111) are not obstructed by the wall of the die body (101) or the anvil (102)) and may be rotated through approximately 90°, to the second lever position, in order to be aligned perpendicular to the axis of the die body (101). Each pivotable lever (111) when so rotated, as shown in FIG. 6C, lies across the first end of the die body and along a radius of the annular first end of the die body, but do not obstruct the cavity opening in the first end (101A) of the die body (101). Further, the bias of the or each second helical spring (107) will abate and the or each shaft head (110A) will rest on the doorway between where the or each shaft (110) enters a shaft recess (110S).

The press, crank, motor or other appropriate means is restarted at FIG. 7A and a compressive force is again applied between the plunger and the anvil. The rotated pivotable lever or levers remain in the second lever position, between the first end of the die body and the anvil, bearing the full compressive pressure and obstructing the relative movement between the anvil and the die body, as shown in FIG. 7B. When the pivotable levers (or a lever) are in the second lever position, a space is formed between the anvil and the first end of the die body, such that further displacement of the plunger into the space is facilitated, as shown in FIG. 7C. By applying the compressive force of the press and displacing the plunger into the remaining part of the cavity, the material sample can be pressed out of the cavity. Further, the latch (112) may be securely engaged in a groove (106A) even closer to the first end (101A) of die body (101), and the second helical spring (107) will again be biased due to compression. Material samples that may be otherwise stuck fast in the cavity can be pushed by the plunger into the space between the anvil and the first end of the die body.

When the press, crank, motor or other appropriate means is disengaged and the anvil removed from the plunger and die, the sample can be easily accessed by the operator and removed manually, as illustrated at FIG. 8A.

FIGS. 8B and 8C show the re-setting of the arrangement after extraction of the compressed material sample. The or each latch (112) is disengaged and, under the action of the first helical spring (105), the die body is released to be displaced relative to the plunger (103) and second outer sleeve portion (108B). The cavity in the die body is vacated by the plunger and the pivotable levers are moved back to their first position. The extension restrictor (120) prevents the die body from moving so far that it becomes completely disengaged from the or each latch (112) body. The cavity is then again in the state depicted at FIG. 5A and ready for further loading with material samples.

FIGS. 9A, 9B and 9C depict exemplary 3D views of a die press according to the principal embodiment of the invention. Specifically, FIG. 9A depicts a die arrangement where the latch (112) is positioned in a groove (106A) some distance from the first end (101A) of die body (101), and where the levers are in a first position. FIG. 9B depicts a compressing position where the die arrangement comprises a latch (112) positioned in a secure engaged position in a groove (106A) closer to the first end (101A) of die body (101), and where the levers are in a second position. FIG. 9C depicts an extraction position where the die arrangement comprises the latch (112) positioned in a secure engaged position in a groove (106A) substantially closest to the first end (101A) of die body (101), and where the levers are in a second position.

FIGS. 10A, 10B and 10C depict sectional views of a die press according to an embodiment of the invention where the outer sleeve (108) is removed and replaced by one or more spring fingers. In the uncompressed position depicted in FIG. 10A, the spring fingers lie adjacent to the first end of the die body. In FIG. 10B the first helical spring is compressed, for example through action of a press, the sample is compressed, and the spring fingers move adjacent to the anvil. In FIG. 10C the anvil is raised, the spring fingers clip in place above the first end of the die body which may be latched in a similar manner to other embodiments described, the anvil is again lowered, and further compression is applied to remove the compressed sample from the cavity and into the recess between the base of the anvil and the first end of the die body. It will be appreciated that the spring fingers may be designed to buckle outwards when compressive forces abate, thereby allowing the die press to reset to the uncompressed position depicted in FIG. 10A.

FIGS. 11A, 11B and 11C depict 3D views of a die press according to an embodiment of the invention where the levers are embodied as latches rotatable about an axis. FIGS. 11A and 11B depict perspective views where the latches are rotated into a second position to facilitate the anvil and allow for extraction to occur. FIG. 11C depicts a perspective view where the latches are in a first position and where the outer sleeve has moved relative to the die body. Although FIGS. 11A, 11B and 11C each show the rotatable latches attached to an outer ring/sleeve, it will be appreciated that in alternative embodiments the rotatable latches may be attached directly to the die body.

FIGS. 12A and 12B depict 3D views of a die press according to an embodiment of the invention where the levers are embodied as latches rotatable about an axis. Specifically, in FIG. 12A the latch resides in a first position, and in FIG. 12B the latch resides in a second position ready to facilitate the anvil and allow for extraction. A release button proximate to the rotatable latch in FIG. 12A may be triggered as the anvil is lowered onto the die body. As the anvil is removed, the released rotatable latch may be biased to rotate about 180 degrees into the second position. The anvil may then be again lowered and the extraction process may commence. These latches may be mounted onto the die body or onto an outer sleeve or other component.

Figure 13D:
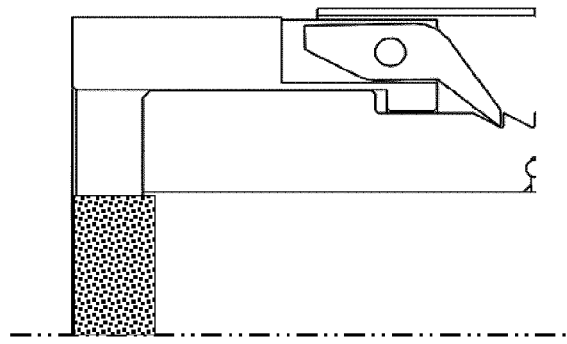
Figure 13C:
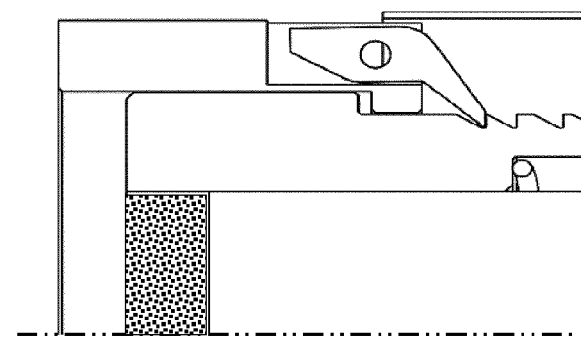
Figure 13B:
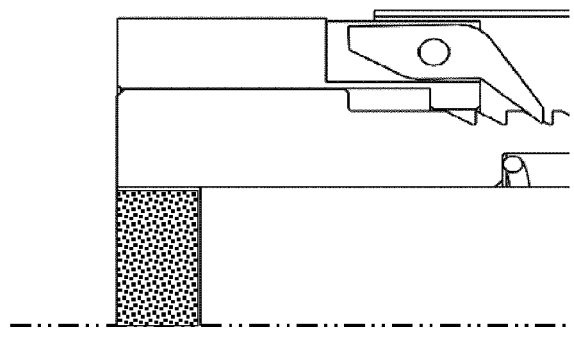
Figure 13A:
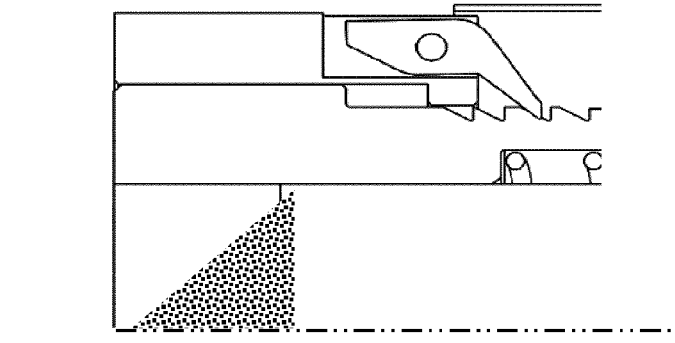

FIGS. 13A, 13B, 13C and 13D depict sectional views of a die press according to an embodiment of the invention where the outer sleeve itself forms the cup tool for sample extraction and where there are no levers. In FIG. 13A the latch is in a rest position and the sample is uncompressed. In FIG. 13B the compressive force is applied and the sample is compressed lowering the die body. In FIG. 13C, one or more second springs have returned the outer sleeve to its original position whilst the die body has been latched in a lower position. The latch is reconfigured to a secure engaged position closest to the first end of the die body, the first outer sleeve portion has moved relative to the first end of the die body, and the die is ready for the anvil (not shown) to be lowered into position. In FIG. 13D the anvil (not shown) has been lowered into position, the plunger has been moved further into the cavity, and the compressed sample has been forced into the recess between the base of the anvil and the first end of the die body formed by the outer sleeve. In alternative embodiments, the outer sleeve may be replaced with a plurality of latchable protruding parts.

Figure 14D:
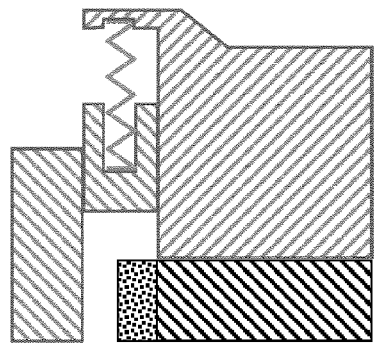
Figure 14C:
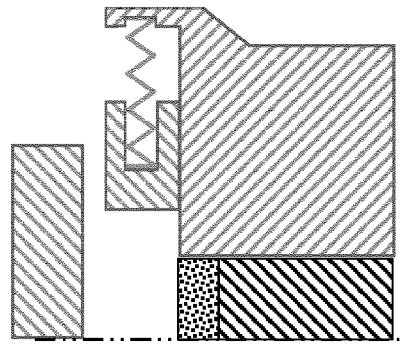
Figure 14B:
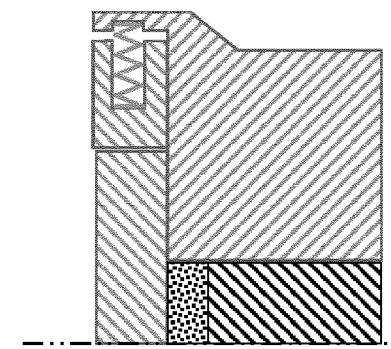
Figure 14A:
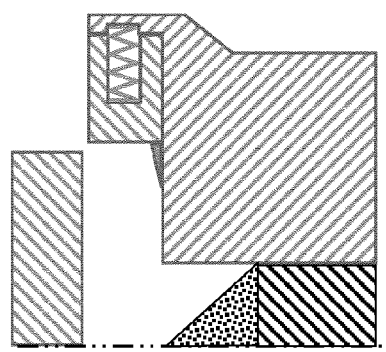

FIGS. 14A, 14B, 14C and 14D are sectional views of a die press according to the invention where the levers are embodied as linear sliding fingers. In FIG. 14A the sample is uncompressed, the anvil is raised, and the sliding finger is held in a first position by a spring-loaded nodule. In FIG. 14B the anvil is lowered, the sample is compressed, and the spring-loaded nodule is depressed. In FIG. 14C the anvil is raised and, as it does so, the sliding finger is biased by a spring to pass the nodule and move to a second position. In FIG. 14D the anvil is again lowered, the plunger is pushed further into the cavity, the compressed sample is forced into the recess between the first end of the die body and the base of the anvil ready for extraction, and the linear sliding finger bears the compressive force.

Figure 15D:
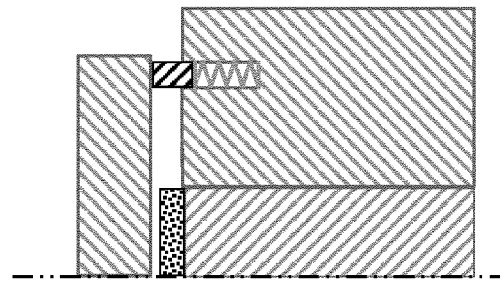
Figure 15C:
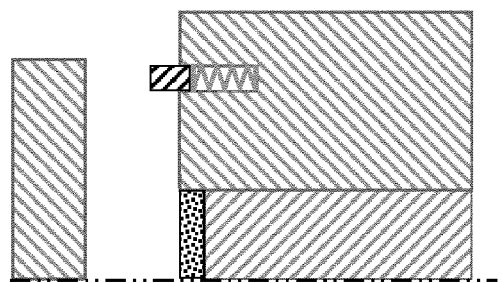
Figure 15B:
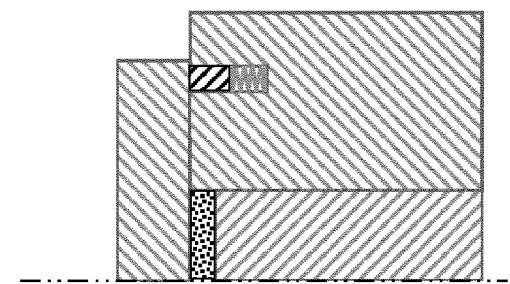
Figure 15A:
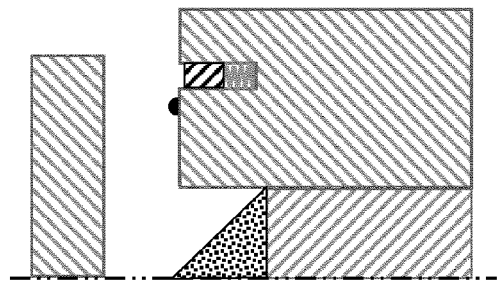

FIGS. 15A, 15B, 15C and 15D are sectional views of a die press according to the invention where the levers are embodied as extendable columns. In FIG. 15A the sample is uncompressed, the anvil is raised, and the extendable column is held in a first position by a catch mechanism. In FIG. 15B the anvil is lowered, the sample is compressed, and the catch mechanism is triggered. In FIG. 15C the anvil is raised and the extendable column is biased to move into a second position by a spring where it is locked in place by the catch mechanism. In FIG. 15D the anvil is again lowered, the plunger is pushed further into the cavity, the compressed sample is forced into the recess between the first end of the die body and the base of the anvil ready for extraction, and the extendable column bears the compressive force.

With reference to FIG. 16, which shows an alternative embodiment of a die press according to the invention. The die press may be generally cylindrical in shape (but may have other geometries), with a cavity, which may be coaxial with the die. The arrangement, comprising a die body and the die base, not as a single integral component, but as two distinct components, is shown in FIG. 16, which illustrates a die body (201) and a die base (anvil) (202). The cavity (204) is configured to receive a plunger (203) and permit movement of the plunger (203) within the cavity (204). The plunger (203) and the die (201, 202) may be together placed within a press (209) which can deliver a compressive force to push the plunger (203) into the cavity (204) of the die body (201). The figure shows the pressure plates (209) of the press at the top and bottom of the figure, but, for clarity, these plates are omitted or partially omitted in the FIGS. 17 to 20, and solid arrows depict the compressive forces, as provided by the press (209).

Depending on user requirements, the compressive force generated by the plunger (103) may be as much as 40 tonnes, however it will be appreciated that in some embodiments a greater or lesser compressive force may be generated. Further, the extractive force required to dislodge or remove compressed samples that have become jammed or stuck in cavity (104) may be as much as 2 tonnes, however it will be appreciated that in some embodiments a greater or lesser extractive force may be required and generated.

The die body (201) is supported by a first helical spring (205) upon the base (203A) of the plunger (203) which facilitate relative movement between the plunger (203) and the die body (201). With no pressure applied by the press, the spring position aligns the first end (201A) of the die body (201) above the first end (203A) of the plunger (203), thereby creating a well at that end of the cavity (204) for receiving sample material (S).

At its second end (201B) the die body (201) is joined to a cylindrical section (206) which is coaxial with the die body (201) and plunger (203). The cavity (204) in the die body extends into the cavity in the cylindrical section (206), the diameter of the cavity (204) in the cylindrical section (206) being greater than the diameter of the cavity (204) in the die body (201), thereby providing a space in which the first helical spring (205), surrounding the core of the plunger (203), is located. As the first helical spring (205) is compressed or stretched, due to relative movement of the die body (201) and the plunger (203), the movements of the first helical spring (205) can be accommodated within this space. The die body and the cylindrical section are formed as a single integral element (or permanently fixed to each other) such that they move in unison.

The operation of the die according to the invention is illustrated in FIGS. 17 to 20. These figures can be interpreted as generally showing movement of the plunger base and plunger, as well as that of the die body, with respect to the anvil, which remains stationery throughout: this is for illustrative purposes only. The invention covers all relative movement between these components and not limited to configurations in which the anvil is stationery.

The figures show embodiments in which the levers are mounted on a sleeve but the invention includes other embodiments in which the levers are mounted on other components: the invention as claimed is not limited to embodiments in which the levers are mounted on the sleeve.

FIG. 17A shows a die/plunger arrangement (201, 202, 203), the die comprising a die body (201) with a cavity (204), for receiving a tightly fitting but displaceable plunger (203) and a removable die anvil (202). The die body (201), the anvil (202), the cavity (204) and the plunger (203) may be broadly cylindrical, but other geometries are also envisaged. The cavity (204) and plunger (203) may be coaxial with the die body (201) and anvil (204), such that the removable die anvil (202) can sit on the surface of the first end (201A) of the die body (201). The surface of the first end (201A) of the die body (201), which surface is annular in shape, and surface of the anvil (202) may be shaped to ease alignment and accommodation of one component to the other, i.e. by recesses, slots, grooves or other surface feature, on one surface, with corresponding feature on the other surface. The plunger (203) is formed as an integral component with a plunger base (203A). Movement of the plunger (203) in the cavity (204) of the die body (201) is guided and controlled by the first helical spring (205) which surrounds the core of the plunger (203). The first helical spring (205) is in mechanical communication with the plunger base (203A) and the inner flange (216) at the second end (201B) of the die body (201), such that it supports the die body (201) on the plunger base (203A): when the plunger (203) is depressed into the cavity (204) by means of a compressive force, the first helical spring (205) exerts a counterforce in the opposite direction.

The arrangement may further comprise an outer sleeve (208), arranged around the die body (201) and being spring-loaded on the die body, as described herein. The outer sleeve (208) is broadly cylindrical in shape, although other appropriate geometries could be envisaged. It surrounds and is coaxial with the die body (202), and has an inner curved surface and outer surface, both extending between a first end (208A) of the outer sleeve and a second end (208B) thereof. A sleeve inner flange means (208C) on the inner side of the outer sleeve (208) abuts with the first end of a second helical spring (207) which surrounds the die body (202). The second end of the second helical spring (207) abuts with die body outer flange means) on the outer side of die body (202) such that the outer sleeve (208) is displaceably mounted on the die body (201) by means of the second helical spring (207). When the second helical spring (207) is depressed the outer sleeve is displaced along the outside of the die body such that the distance between the sleeve inner flange means and the die body outer flange means is reduced: when the second helical spring is released the distance between the sleeve inner flange means and the die body outer flange means increases, and the first end of the outer sleeve can be displaced beyond the first end of the die body.

The arrangement comprises a ratchet mechanism. This mechanism comprises the cylindrical section (206) at the second end (201A) of the die body (201) and one or more radially-displaceable latches (212). The or each latch (212) is free to move within corresponding longitudinal slots in the cylindrical section (206), the slots being aligned parallel to the axis of the die body (201) and of the cylindrical section (202). The inner surface of the cylindrical section (206) has a series of parallel circular grooves (206A) and the latches (212) are configured to communicate with the parallel circular grooves, which each serve as the "ratchet" to the latch's "pawl". The position of the outer sleeve (208) on the die body (201) may be temporarily fixed by engaging at least one radially-aligned latch (212) with a recess (or groove) on the inner cylindrical surface of the outer sleeve and with the facing section of the groove, effectively "locking" the outer sleeve in the corresponding position on the die body. When the radially-aligned latch is released, by inward radial displacement of the latch and disengagement of the latch from the recess formed between the first and second circumferential abutments in the inner surface of the outer sleeve, the outer sleeve is effectively "unlocked" to move along the outer surface of the die body. The ratchet mechanism acts in combination with the first helical spring to hold the die body at any given position relative to the plunger.

FIG. 17A illustrates the die body (201) with uncompressed material sample (S) already loaded in the recess (that part of the cavity (204) not occupied by the plunger (203)) by the end of the plunger (203) and the inner surface of the die body (201). The ratchet mechanism, with the latch (212) displaced on one of circular grooves (206A) close to the second end of the die body, and contained between the circumferential abutments in the outer sleeve, keep the second helical spring (207) compressed such that the first end of the die body is broadly at the same level or adjacent the first end (208A) of the outer sleeve (208). The material (S) is loaded in a malleable or formable format, for example in powder form.

The outer sleeve (208) comprises, at a first end (208A), one or more pivotable levers (211), each of which may be rotated about a pivot (210), the pivots being located around the circumference the first end (208A) of the outer sleeve (208). The levers (211) may be, collectively or individually, angularly displaced around their respective pivots (210) and may be aligned in a first lever position, parallel to the axis of the outer sleeve (208) or perpendicular to it, in a second lever position, or at any angular displacement between these two extremes. The angular displacement of the pivotable levers (211) may be manual (i.e., manual rotation by the operator) or motorised, and may be automated within the sequence of movements described herein. When the first end (208A) of the outer sleeve (208) is located adjacent the outer surface of the die body (201) in a first sleeve position the pivotable levers (211) are aligned longitudinally in the first lever position, i.e. parallel to the axis of the die body (201) and the axis of the outer sleeve (208). In the first lever position the relevant lever is aligned perpendicular to the plane of the cavity opening at the first end of the die body. In this first position of the outer sleeve (208), the levers effectively extend the length of the outer sleeve (208), and may be prevented from rotation to the second lever position by the outer surface of the die body (201) or the outer perimeter of the anvil (202). If not blocked by outer surface the die body (201) or the presence of the anvil (202) (see below), the pivotable levers (211) may be rotated to a second lever position and be aligned perpendicular to the axis of the die body (201). The lever or levers (211) in this second lever position lies across the end surface at the first end (201A) of the die body (201) and along a radius of the annular first end of the die body (201), parallel to the plane of the cavity opening at the first end of the die body. The levers (211) are of robust material and structure and capable of withstanding the pressures exerted by the press (209) and transmitting those forces from the anvil (202) to the die body (201). The length of each lever (211) is shorter than the thickness of the die body (201) such that, in the second lever position, the levers (211) extend radially toward the centre of the opening of the cavity (204) but not overlapping with the opening.

In FIG. 17B the action of the press (not shown in the diagram) is shown by the solid arrows at the base and top of the figure, the plunger (203) being displaced by the action of the press. The anvil (202) is placed on the first end (201A) of the die body (201). The compressive pressure of the press acting on the plunger base (203A) and the anvil (202) causes the plunger (203) and the anvil (202) to exert a compression force on the material sample (S), located directly between the distal end of the plunger (203) in the cavity (204) and the surface of the anvil (202).

The latches (212) are then displaced radially inwards and disengage from the recess (214) formed between the first and second circumferential abutments (213, 215) in the inner surface of the outer sleeve (208), such that the latches (212) then engage with the second circumferential abutment (215) on the inner surface of the outer sleeve (208), thereby releasing the outer sleeve (208) which, under the action of the second helical spring (207), moves along the outer surface of the die body (201) to a second sleeve position. The first end (208A) of the outer sleeve (208) and the pivotable levers (211) clear the first end (201A) of the die body (201), such that the pivotable levers (211), aligned in parallel to the length of the outer surface of the die body (208), in a first lever position, and being broadly adjacent to, and surrounding, the anvil (202), as shown in FIG. 17C.

The main pressing action is then provided by the press, as indicated by the solid arrows in FIG. 18A, which compresses the first helical spring (205) between the plunger base (203A) and the inner flange (216) of the die body (201), and forces the plunger (203) to compress the material sample against the anvil (202) within the die body cavity (204). The volume of the sample material (S) is reduced by the compressive force and adopts the dimensions and shape of the void in the cavity (204) between the distal end of the plunger (203) and the anvil (202). The force applied is sufficient for the then compressed sample (S) to be held by the walls of the cavity (204). While the plunger (203) is still depressed in the cavity (204) the latches (212), while still engaged with the second circumferential abutment (215) in the inner surface of the outer sleeve (208), are then displaced within the longitudinal slots in the cylindrical section (206) and re-applied at a circular groove (206A) closer to the second end of the die body (201), thereby locking the die body (201) relative to the plunger (203).

In the second sleeve position the first end (208A) of the outer sleeve (208) extends beyond and thereby "clears" the first end (201A) of the die body (201) and the pivotable levers (211) extend in a first lever position, i.e. parallel to the outer sleeve (208) and adjacent to the outer surface of the anvil (202). At FIG. 18B the compressive pressure is removed and the anvil (202) is distanced from the die body/plunger (201,203) combination, or vice-versa, in order to access the compressed material sample (S).

As mentioned above, a problem frequently encountered at this point is the compressed material sample (S), although accessible after the anvil (202) is removed, is stuck hard in the recess formed in the cavity (204) and the plunger (203) and is difficult to extract. In accordance with the invention the problem is solved as described in the following paragraphs, without resorting to use of a cup tool.

The anvil may be removed from the die body/plunger combination. The outer sleeve (208) is still in the second sleeve position, such that the first end of the outer sleeve (208) extends beyond or "clears" the first end (201A) of the die body (201). As shown in FIG. 18B the pivotable levers (211) are free to rotated (i.e., are not obstructed by the wall of the die body (201)) and may be rotated through approximately 90°, to the second lever position, in order to be aligned perpendicular to the axis of the die body (201). Each lever (211), when so rotated, as shown in FIG. 18C, lies across the first end of the die body and along a radius of the annular first end of the die body, but do not obstruct the cavity opening in the first end (202A) of the die body (202).

The press is restarted at FIG. 19A and a compressive force from the press is applied between the plunger and the anvil. The rotated lever or levers remain in the second lever position, between the first end of the die body and the anvil, bearing the full compressive pressure and obstructing the relative movement between the anvil and the die body, as shown in FIG. 19B. When the levers (or a lever) are in the second lever position, a space is formed between the anvil and the first end of the die body, such that further displacement of the plunger into the space is facilitated, as shown in FIG. 19C. By applying the compressive force of the press and displacing the plunger into the remaining part of the cavity, the material sample can be pressed out of the cavity. Material samples that may be otherwise stuck fast in the cavity can be pushed by the plunger into the space between the anvil and the first end of the die body.

When the press is disengaged and the anvil removed from the plunger and die, the sample can be easily accessed by the operator and removed manually, as illustrated at FIG. 20A.

FIGS. 20B and 20C show the re-setting of the arrangement after extraction of the compressed material sample. By moving the outer sleeve such that the second spring is compressed, the circumferential abutment (213) displaces the or each latch releasing the die body to its original position under the action of the first spring. The pivotable levers are reset by the die body rotating them from the second lever position back to the first lever position, and the second spring is compressed further thereby causing the outer sleeve to be moved back from its second sleeve position on the outer surface of the die body to a first sleeve position. The cavity is then again in the state depicted at FIG. 17A and ready for further loading with material samples.

The aforementioned diagrams illustrate the architecture, functionality, and operation of possible implementations of systems and methods according to various embodiments of the present invention. It should however be noted that, in some alternative implementations, the functions and processes noted may occur out of the indicated order, or in different combinations to those noted in the figures and their corresponding description. For example, two successive stages may, in fact, be executed substantially concurrently, or the portions may sometimes be executed in the reverse order, depending upon the functionality involved. It will also be noted that each stage of the diagrams, and combinations of portions in the diagrams, may be implemented by combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware.

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention. Further, where arrows have been used to exemplify the direction and/or magnitude of motion or force, it will be appreciated that these are not intended to be limiting and variations may be apparent to those skilled in the art.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

The invention claimed is:

1. A die arrangement for pressing, sintering or stamping comprising:
   a die body with a cavity extending from an opening at a first end of said die body to an opening at a second end of said die body,
   a plurality of levers arranged around the opening at said first end of said die body, wherein each lever is displaceable between a first lever position and a second lever position,
   wherein,
   in said second lever position, said plurality of levers forms a recess into which a compressed sample may be displaced.

2. A die arrangement as in claim 1 wherein, in the first position, each lever is aligned perpendicular with the plane of the cavity opening at the first end of said die body, and wherein, in the second position, each lever is aligned parallel to the plane of the cavity opening at the first end of said die body.

3. A die arrangement as in claim 1, wherein said die body is configurable to receive a die plunger at said second end of said die body, said plunger being displaceable within the cavity.

4. A die arrangement according to claim 3, further comprising a first spring, wherein said die plunger is spring mounted in said second end of said die body by said first spring, said first spring being compressible during relative displacement between said die plunger and said die body.

5. A die arrangement according to claim 1, wherein said die body is configurable to receive a die plunger at said end of said die body, said plunger being displaceable within the cavity,
the die arrangement further comprising an outer sleeve mounted on the die body, the outer sleeve being coaxial with the die body and having a first outer sleeve portion nearest to the first end of said die body, said plurality of levers being mounted on said first outer sleeve portion, and one of:
a second outer sleeve portion nearest to the second end of said die body;
a second outer sleeve portion fixedly attached to a base of said plunger nearest to the second end of said die body; or,
a second outer sleeve portion extending directly from the plunger base nearest to the second end of said die body, the second outer sleeve portion and the plunger base being a single unitary component.

6. A die arrangement according to claim 1, wherein said die body is configurable to receive a die plunger at said second end of said die body, said plunger being displaceable within the cavity,
wherein, in the first position, each lever is aligned perpendicular with the plane of the cavity opening at the first end of said die body, and wherein, in the second position, each lever is aligned parallel to the plane of the cavity opening at the first end of said die body,
the die arrangement further comprising an outer sleeve mounted on the die body, the outer sleeve being coaxial with the die body and having a first outer sleeve portion nearest to the first end of said die body, said plurality of levers being mounted on said first outer sleeve portion, and one of:
a second outer sleeve portion nearest to the second end of said die body;
a second outer sleeve portion fixedly attached to a base of said plunger nearest to the second end of said die body; or,
a second outer sleeve portion extending directly from the plunger base nearest to the second end of said die body, the second outer sleeve portion and the plunger base being a single unitary component.

7. A die arrangement according to claim 1, wherein said die body is configurable to receive a die plunger at said second end of said die body, said plunger being displaceable within the cavity,
wherein, in the first position, each lever is aligned perpendicular with the plane of the cavity opening at the first end of said die body, and wherein, in the second position, each lever is aligned parallel to the plane of the cavity opening at the first end of said die body, and wherein said die body is configurable to receive a die plunger at said second end of said die body, said plunger being displaceable within the cavity,
further comprising an outer sleeve mounted on the die body, the outer sleeve being coaxial with the die body and having a first outer sleeve portion nearest to the first end of said die body, said plurality of levers being mounted on said first outer sleeve portion, and one of:
a second outer sleeve portion nearest to the second end of said die body;
a second outer sleeve portion fixedly attached to a base of said plunger nearest to the second end of said die body; or,
a second outer sleeve portion extending directly from the plunger base nearest to the second end of said die body, the second outer sleeve portion and the plunger base being a single unitary component.

8. A die arrangement according to claim 1, wherein said die body is configurable to receive a die plunger at said second end of said die body, said plunger being displaceable within the cavity,
wherein, in in the first position, each lever is aligned perpendicular with the plane of the cavity opening at the first end of said die body, and wherein, in the second position, each lever is aligned parallel to the plane of the cavity opening at the first end of said die body, and wherein said die body is configurable to receive a die plunger at said second end of said die body, said plunger being displaceable within the cavity,
further comprising a first spring, wherein said die plunger is spring mounted in said second end of said die body by said first spring, said first spring being compressible during relative displacement between said die plunger and said die body, and an outer sleeve mounted on the die body, the outer sleeve being coaxial with the die body and having a first outer sleeve portion nearest to the first end of said die body, said plurality of levers being mounted on said first outer sleeve portion, and one of:
a second outer sleeve portion nearest to the second end of said die body;
a second outer sleeve portion fixedly attached to a base of said plunger nearest to the second end of said die body; or,
a second outer sleeve portion extending directly from the plunger base nearest to the second end of said die body, the second outer sleeve portion and the plunger base being a single unitary component.

9. A die arrangement as in claim 5, wherein the outer sleeve is displaceable on the die body between a first sleeve position and a second sleeve position, wherein, in the second sleeve position, the first outer sleeve portion is displaced to lie proximate to said first end of said die body.

10. A die arrangement according to claim 5, further comprising a second spring, wherein said first outer sleeve portion is spring mounted on one of said second outer sleeve portion or said die body by said second spring, said second spring being compressible during relative displacement between said second outer sleeve portion or said die body and said first outer sleeve portion.

11. A die arrangement according to claim 5, wherein the outer sleeve is displaceable on the die body between a first sleeve position and a second sleeve position, wherein, in the second sleeve position, the first outer sleeve portion is displaced to lie proximate to said first end of said die body,
further comprising a second spring, wherein said first outer sleeve portion is spring mounted on one of said second outer sleeve portion or said die body by said second spring, said second spring being compressible during relative displacement between said second outer sleeve portion or said die body and said first outer sleeve portion.

12. A die arrangement according to claim 5, wherein said second end of said die body comprises a plurality of grooves, and wherein at least one of said second outer sleeve portion or said plunger further comprise one or more latches, said one or more latches being engageable with said grooves.

13. A die arrangement according to claim 5, wherein the outer sleeve is displaceable on the die body between a first sleeve position and a second sleeve position, wherein, in the second sleeve position, the first outer sleeve portion is displaced to lie proximate to said first end of said die body,
wherein said second end of said die body comprises a plurality of grooves, and wherein at least one of said second outer sleeve portion or said plunger further comprise one or more latches, said one or more latches being engageable with said grooves.

14. A die arrangement according to claim 5, wherein the outer sleeve is displaceable on the die body between a first sleeve position and a second sleeve position, wherein, in the second sleeve position, the first outer sleeve portion is displaced to lie proximate to said first end of said die body,
further comprising a second spring, wherein said first outer sleeve portion is spring mounted on one of said second outer sleeve portion or said die body by said second spring, said second spring being compressible during relative displacement between said second outer sleeve portion or said die body and said first outer sleeve portion,
wherein said second end of said die body comprises a plurality of grooves, and wherein at least one of said second outer sleeve portion or said plunger further comprise one or more latches, said one or more latches being engageable with said grooves.

15. A die arrangement according to claim 13, wherein when said one or more latches are engaged with said grooves, relative displacement between said die body, said die plunger, and said second outer sleeve portion is constrained, said one or more latches being held in said grooves by a third spring.

16. A die arrangement according claim 1 further comprising an anvil, wherein said anvil is displaceable between an engaged position at said first end of said die body and a disengaged position away from said first end of said die body.

17. A die arrangement according to claim 1, wherein the cavity at said first end of said die body is configured to receive and retain a malleable or powdered material sample prior to said die arrangement commencing pressing, sintering or stamping.

18. A die arrangement according to claim 1, said die arrangement further comprising a press, wherein said die body is retained within said press and wherein said press is configured to generate compressive pressure between said first end of said die body and said second end of said die body.

19. A press integrally comprising the die arrangement according to claim 1.

20. A method for pressing, sintering or stamping comprising the steps of:
loading a sample into the die arrangement of claim 1 including loading the sample into the first end of the die body of the die arrangement;
compressing said sample by applying a compressive force between said first end of said die body and said second end of said die body, the sample being retained within the cavity of the die body during compression;
displacing each of the plurality of levers between the first position perpendicular with the plane of the cavity opening at said first end of said die body to the second position where each lever is aligned parallel to the plane of the cavity opening at said first end of said die body; and,
applying a compressive force between said lever in said second position and said second end of said die body, wherein proximate to said first end of said die body said plurality of levers in said second position provides a recess into which said compressed sample displaced, said compressed sample when displaced being freely extractable from said die arrangement.

* * * * *